United States Patent [19]

Hamano

[11] 3,849,765

[45] Nov. 19, 1974

[54] PROGRAMMABLE LOGIC CONTROLLER

[75] Inventor: Goro Hamano, Osaka, Japan

[73] Assignee: Matsushita Electrical Industrial Co., Ltd., Osaka, Japan

[22] Filed: Nov. 20, 1972

[21] Appl. No.: 307,791

[30] Foreign Application Priority Data

| | | |
|---|---|---|
| Nov. 30, 1971 | Japan | 46-97005 |
| Nov. 30, 1971 | Japan | 46-97006 |
| Mar. 17, 1972 | Japan | 47-27779 |

[52] U.S. Cl. .......... 340/172.5
[51] Int. Cl. .......... G06f 3/00, G06f 9/00
[58] Field of Search .......... 340/172.5

[56] References Cited

UNITED STATES PATENTS

| | | | |
|---|---|---|---|
| 3,350,687 | 10/1967 | Gabrielson | 340/172.5 |
| 3,359,544 | 12/1967 | Macon et al. | 340/172.5 |
| 3,363,234 | 1/1968 | Erickson et al. | 340/172.5 |
| 3,651,484 | 3/1972 | Smeallie | 340/172.5 |
| 3,686,639 | 8/1972 | Fletcher et al. | 340/172.5 |
| 3,701,113 | 10/1972 | Chace et al. | 340/172.5 |

OTHER PUBLICATIONS

Digital Corp., "Control Handbook" 1971, pp. 360–381.

*Primary Examiner*—Gareth D. Shaw
*Assistant Examiner*—Paul R. Woods
*Attorney, Agent, or Firm*—Wenderoth, Lind & Ponack

[57] ABSTRACT

A programmable logic controller having a main memory means which stores a plurality of programs, program address register means which contains an address of a location of memory means from which an instruction is taken to an instruction register means and an input and output control circuit means which compares an input with conditions specified in an instruction and energizes or deenergizes an output in accordance with the instructions is disclosed. An auxiliary memory means is provided to store address data concerning each of the plurality of programs. A program select register means is provided to specify an address location in the auxiliary memory means. Instructions for each of the plurality of programs are sequentially obtained and performed by using the auxiliary memory means and the program select register means, thus sequencing operations for each of the plurality of programs are performed by scanning the plurality of programs in time division mode.

8 Claims, 43 Drawing Figures

| ADDRESS | CONTENTS | | | | | |
|---|---|---|---|---|---|---|
| 0 | 1 | FB | | | | 1 |
| 1 | 1 | FC | | | | 2 |
| 2 | | | 1 | A-START | 3 | 2 |
| 3 | 1 | A-DN | | S4 | 4 | 3 |
| 4 | 1 | TMA | | | | 5 |
| 5 | | | 1 | TA | 6 | 5 |
| 6 | 0 | TMA | | | | 7 |
| 7 | 0 | A-DN | 1 | S3 | 8 | 7 |
| 8 | 1 | A-ROT | 1 | S2 | 9 | 8 |
| 9 | | | 1 | S5 | 10 | 9 |
| 10 | 1 | A-DN | 1 | S4 | 11 | 10 |
| 11 | 1 | TMA | | | | 12 |
| 12 | | | 1 | TA | 13 | 12 |
| 13 | 0 | TMA | | | | 14 |
| 14 | 0 | A-DN | 1 | S3 | 15 | 14 |
| 15 | | | 1 | FB | 16 | 18 |
| 16 | 1 | B-START | | | | 17 |
| 17 | 0 | FB | | | | 18 |
| 18 | 0 | A-ROT | 1 | S1 | 2 | 18 |

| ADDRESS | CONTENTS | | | | | |
|---|---|---|---|---|---|---|
| 19 | | | 1 | B-START | 20 | 19 |
| 20 | 1 | B-ROT | 1 | S6 | 21 | 20 |
| 21 | 1 | B-DN | 1 | S8 | 22 | 21 |
| 22 | 1 | TMB | | | | 23 |
| 23 | | | 1 | TB | 24 | 23 |
| 24 | 0 | TMB | | | | 25 |
| 25 | 0 | B-DN | 1 | S7 | 26 | 25 |
| 26 | 0 | B-ROT | 1 | S5 | 27 | 26 |
| 27 | | | 1 | FC | 28 | 30 |
| 28 | 1 | C-START | | | | 29 |
| 29 | 0 | FC | | | | 30 |
| 30 | | | 1 | S11 | 20 | 30 |

| ADDRESS | CONTENTS | | | | | |
|---|---|---|---|---|---|---|
| 31 | | | 1 | C-START | 32 | 31 |
| 32 | 1 | C-ROT | 1 | S10 | 33 | 32 |
| 33 | 1 | C-DN | 1 | S12 | 34 | 33 |
| 34 | 1 | TMC | | | | 35 |
| 35 | | | 1 | TC | 36 | 35 |
| 36 | 0 | TMC | | | | 37 |
| 37 | 0 | C-DN | 1 | S11 | 38 | 37 |
| 38 | 0 | C-ROT | 1 | S9 | 39 | 38 |
| 39 | 1 | C-DN | 1 | S12 | 40 | 39 |
| 40 | 1 | TMC | | | | 41 |
| 41 | | | 1 | TC | 42 | 41 |
| 42 | 0 | TMC | | | | 43 |
| 43 | 0 | C-DN | 1 | S11 | 32 | 43 |

| ADDRESS | CONTENTS | |
|---|---|---|
| 0 | 1 | FB |
| 1 | 1 | FC |
| 2 | 3 | A-START |
| 3 | | 2 |
| 4 | 1 | A-DN |
| 5 | 3 | S4 |
| 6 | | 5 |
| 7 | 1 | TMA |
| 8 | 3 | TA |
| 9 | | 8 |
| 10 | 0 | TMA |
| 11 | 0 | A-DN |
| 12 | 3 | S3 |
| 13 | | 12 |
| 14 | 1 | A-ROT |
| 15 | 3 | S2 |
| 16 | | 15 |
| 17 | 3 | S5 |
| 18 | | 17 |
| 19 | 1 | A-DN |
| 20 | 3 | S4 |
| 21 | | 20 |
| 22 | 1 | TMA |
| 23 | 3 | TA |
| 24 | | 23 |
| 25 | 0 | TMA |
| 26 | 0 | A-DN |
| 27 | 3 | S3 |
| 28 | | 27 |
| 29 | 3 | FB |
| 30 | | 33 |
| 31 | 1 | B-START |
| 32 | 0 | FB |
| 33 | 0 | A-ROT |
| 34 | 3 | S1 |
| 35 | | 34 |
| 36 | 3 | DUMMY |
| 37 | | 2 |

FIG. 8A

| ADDRESS | CONTENTS | |
|---|---|---|
| 38 | 3 | B-START |
| 39 | | 38 |
| 40 | 1 | B-ROT |
| 41 | 3 | S6 |
| 42 | | 41 |
| 43 | 1 | B-DN |
| 44 | 3 | S8 |
| 45 | | 44 |
| 46 | 1 | TMB |
| 47 | 3 | TB |
| 48 | | 47 |
| 49 | 0 | TMB |
| 50 | 0 | B-DN |
| 51 | 3 | S7 |
| 52 | | 51 |
| 53 | 0 | B-ROT |
| 54 | 3 | S5 |
| 55 | | 54 |
| 56 | 3 | FC |
| 57 | | 60 |
| 58 | 1 | C-START |
| 59 | 0 | FC |
| 60 | 3 | S11 |
| 61 | | 60 |
| 62 | 3 | DUMMY |
| 63 | | 40 |

FIG. 8B

| ADDRESS | CONTENTS | |
|---|---|---|
| 64 | 3 | C-START |
| 65 | | 64 |
| 66 | 1 | C-ROT |
| 67 | 3 | S10 |
| 68 | | 67 |
| 69 | 1 | C-DN |
| 70 | 3 | S12 |
| 71 | | 70 |
| 72 | 1 | TMC |
| 73 | 3 | TC |
| 74 | | 73 |
| 75 | 0 | TMC |
| 76 | 0 | C-DN |
| 77 | 3 | S11 |
| 78 | | 77 |
| 79 | 0 | C-ROT |
| 80 | 3 | S9 |
| 81 | | 80 |
| 82 | 1 | C-DN |
| 83 | 3 | S12 |
| 84 | | 83 |
| 85 | 1 | TMC |
| 86 | 3 | TC |
| 87 | | 86 |
| 88 | 0 | TMC |
| 89 | 0 | C-DN |
| 90 | 3 | S11 |
| 91 | | 90 |
| 92 | 3 | DUMMY |
| 93 | | 66 |

FIG. 8C

PROGRAMMABLE LOGIC CONTROLLER

BACKGROUND OF THE INVENTION

This invention relates to a programmable logic controller and especially to a programmable logic controller which performs sequential operations in accordance with the programmed instructions by scanning the input, comparing the input with the conditions specified in the program, and finally by energizing or deenergizing the outputs.

The conventional controller has relays or logic elements which must be interconnected differently for each control problem so as to determine the sequence of events. The programmable logic controller, on the other hand, only requires that the sequence be stored in its memory. In other words, the sequence may be programmed in the programmable logic controller. However, a conventional programmable logic controller has only one program counter holding a current address data of the memory storing the sequence program, that is, only one control path of the sequence program, and so the sequence program including all the conditions of control probems is required. Therefore, it is very difficult for a user to make a sequence program for control of a complex machine having a plurality of stations interacting with each other.

SUMMARY OF THE INVENTION

It is an object of the present invention to provide a novel and improved programmable logic controller which may be easily programmed.

It is another object of the present invention to provide a programmable logic controller which stores a plurality of sequence programs and performs complex sequencing operations.

It is a further object of the present invention to provide a programmable logic controller which stores a set of sequence programs and controls a plurality of devices independently in time division mode.

These objects are achieved by a programmable logic controller for controlling a device having at least one input and at least one output according to this invention which comprises main memory means for storing a plurality of programs, each of said plurality of programs consisting of a sequence of instructions, each instructions comprising an output part, an input part and two destination address parts; auxiliary memory means for storing a plurality of program addresses corresponding to said plurality of programs; program select register means operatively connected to said auxiliary memory means for selecting one of said plurality of program addresses stored in said auxiliary memory means; address reading means operatively connected to said auxiliary memory means for reading out the program address in said auxiliary memory means selected by said program select register means; memory address register means operatively connected to said main memory means and to said auxiliary memory means for addressing said main memory means with said program address read out by said address reading means; instruction reading means operatively connected to said main memory means for reading out the instruction in said main memory means addressed by said memory address register means; instruction register means operatively connected to said main memory means for storing said instruction read out by said instruction reading means; input and output control circuit means operatively connected to said instruction register means and to said device and having a plurality of input terminals to which said at least one input of said device is connected and a plurality of output terminals to which said at least one output of said device is connected, said input and output control circuit means including a decoder means operatively connected to said instruction register means for selecting one of said plurality of output terminals specified by said output part of said instruction in said instruction register means, means operatively connected to said decoder means for energizing or deenergizing the output connected to the output terminal selected by said decoder means in accordance with said output part of said instruction in said instruction register means, another decoder means operatively connected to said instruction register means for selecting one of said plurality of input terminals specified by said input part of said instruction in said instruction register means, comparing means operatively connected to said another decoder means for comparing the input connected to the input terminal selected by said another decoder means with the condition specified by said input part of said instruction in said instruction register means and selecting means responsive to the result of the comparison for selecting one of two destination address parts of said instruction in said instruction register means dependingg upon said result of said comparison; destination address reading means operatively connected to said instruction register means and to said selecting means for reading out the destination address part of said instruction stored in said instruction register means selected by said selecting means; temporary register means operatively connected to said instruction register means for storing said destination address part read out by said destination addrress reading means; writing means operatively connected to said auxiliary memory means for writing said destination address part in said temporary register means into the same location of said auxiliary memory means from which said program address was read out by said address reading means; and means operatively connected to said program select register means for causing said program select register means to select a different program address after said destination address is written into said auxiliary memory means by said writing means.

Thus, sequential operations for each of said plurality of programs are performed by scanning said plurality of programs, in time division mode.

These and others features will be readily apparent to those skilled in the art from a consideration of the following description with the accompanying drawings.

BRIEF DESCRIPTION OF THE DRAWINGS

FIGS. 8A–8C show the contents stored in the main memory of the programmable logic controller shown in FIGS. 9 and 11.

DESCRIPTION OF THE PREFERRED EMBODIMENTS

Before the detailed description of the present invention is given, the outline of a controlled device used in the explanation of the invention will be briefly explained.

Figure 1A:
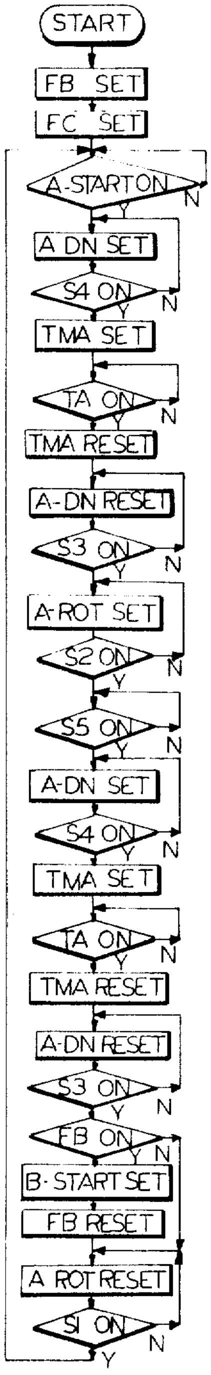
FIGS. 1A–1C are state flow charts of a controlled device used for an explanation of the invention.
Figure 1B:
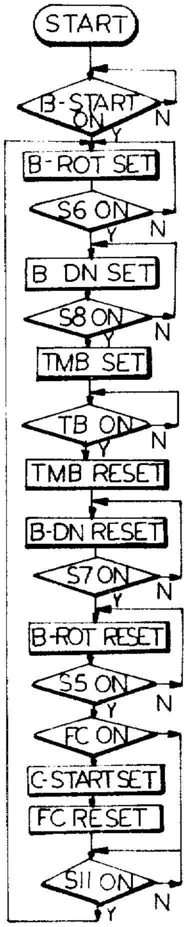

FIGS. 1A, 1B and C show state flow-charts representing the transitions of states of a controlled device for explanation of the invention.

Figure 1C:
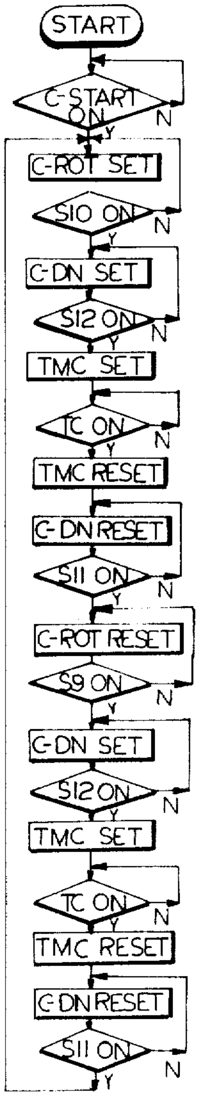

As shown in FIGS. 1A–1C, the controlled device consists of three stations A, B and C which carry out their operations while interacting with each other.. The sequence of operations for the stations A, B and C are shown in FIGS. 1A, 1B and 1C respectively. In the figures, a state or action block surrounded by a rectangular symbol indicates the performance of an action, for example, setting the output to OFF. A qualifier surrounded by a diamond indicates a step of directing the flow of action.

An input signal is tested to see whether it is an ON or OFF signal, and two arrows show the directions to the next destinations corresponding to the test result; supplementing Y for ON and N for OFF. At the first stage of the sequence of the station A, both FB and FC are set to ON. These operations set the initial conditions for the stations B and C. The station A stays in the same state until the A-START signal becomes ON. When the A-START signal becomes ON, that is, becomes logically 1, the state of the station A changes to the next state. B-START and C-START signals begin the operations of corresponding stations in the same way. The stations A, B and C have similar structures and each consists of an arm which is capable of moving up and down and rotating. When A-DN, B-DN and C-DN are set to ON, arms RA, RB and RC go down, respectively. When they arrive at the lowermost position, sensors such as microswitches S4, S8 and S12 turn ON, respectively, When A-DN, B-DN and C-DN are set to OFF, while arms RA, RB and RC are at the lowermost position, arms RA, RB and RC go up and sensors S3, S7 and S11 turn ON upon arrival of the arms at the uppermost position, respectively. In the same way, when A-ROT, B-ROT and C-ROT are set to ON, arms RA, RB and RC rotate and sensors S2, S6 and S10 turn ON after rotation through the pre-set angle, respectively. When A-ROT, B-ROT, and C-ROT are set to OFF, arms RA, RB and RC rotate in the opposite direction and sensors S1, S5 and S9 turn ON upon return of the arms to the initial positions; respectively.

Each arm stays at the bottom, when it goes down, for a time specified by a corresponding timer. Three timers TMA, TMB and TMC are provided for arms RA, RB and RC, respectively. When timers TMA, TMB and TMC are set to ON, output signals TA, TB and TC become ON after the elapse of the pre-set time, respectively. When timers TMA, TMB and TMC are set to OFF, output signals TA, TB and TC turn OFF, respectively, The operations of stations A, B and C interact with each other.

The operation of station A is caused to interact by the state of the sensor S5 which is controlled during the operation of station B. B-START which is a start signal for station B is controlled during the operation of station A. The operation of station B is influenced by the state of the sensor S11 which is controlled during the operation of station C. C-START which is a start signal for station C is controlled during the operation of station B.

In FIGS. 1 A–1C, three flow-charts are shown. As a conventional programmable logic controller has only one control path for the sequential program, it is necessary for the conventional programmable logic controller to rearrange the three flow-charts respectively shown in FIGS. 1A–1C into one flow-chart including all the steps of the three flow-charts. On the contrary, the programmable logic controller according to the present invention can handle three flow-charts.

The purpose of citing FIGS. 1A–1C is to provide an outline of said controlled device which may be used for an explanation of the invention. It is needless to say that stopping said controlled device can be easily carried out in any known manner. Including the stopping block unnecessarily complicates the flow charts. Thus, the flow-chart exits of FIGS. 1A–1C are omitted.

Figures 2, 3A, 3B, 3C:
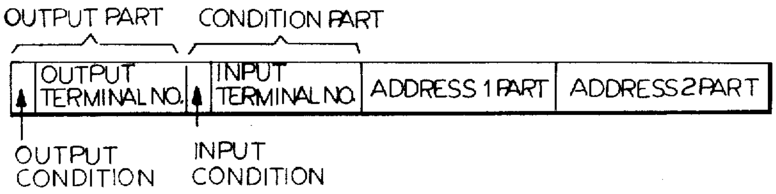
FIG. 2 is an example of an instruction word stored in the main memory of the programmable logic controller in accordance with the invention.
FIGS. 3A–3C show the contents stored in the main memory of the programmable logic controller shown in FIG. 4.

FIG. 2 is an example of the construction of the instruction word stored in the memory of the programmable logic controller in accordance with the present invention. The instruction word consists of an output part, a condition part, an address 1 part and an address 2 part, each having 8 bits capacity.

The output part is used to specify which output terminal should be energized or deenergized. The leftmost bit specifies the output condition. A specific output is energized when the leftmost bit is 1 and is deenergized for 0. The remaining 7 bits of the output part specify an output terminal number in a binary code.

The condition part is used to test whether a specific input is being energized or deenergized. The leftmost bit specifies the input condition. When the leftmost bit of the condition part is 1, the test made is whether the specific input is being energized or not. For 0, the test made is whether the specific input is being deenergized or not. The remaining 7 bits of the condition part are used to specify an input terminal number in a binary code.

The address 1 part is used to specify a next address location of a stored instruction to be retrieved when the test condition specified by the condition part is satisfied.

The address 2 part is used to specify a next address location of a stored instruction to be retrieved at the next cycle when the test condition is not satisfied or when the instruction word does not specify the test condition.

For the address 1 part and the address 2 part, absolute addresses in the memory of the controller are used and are represented by binary codes.

The flow-charts shown in FIGS. 1A–1C are rewritten as shown in FIGS. 3A–3C using the instruction words as described in connection with FIG. 2 and using the addresses of the memory. For easy understanding, input and output terminal numbers are represented by symbols and address 1 parts and address 2 parts are shown in decimal notations. The leftmost bits of the output parts and the condition parts are shown in 1 or 0.

In FIGS. 3A–3C, addresses O through 18 store the instruction words for station A, 19 through 30 store the instruction words for station B and 31 through 43 for station C.

Figure 4:
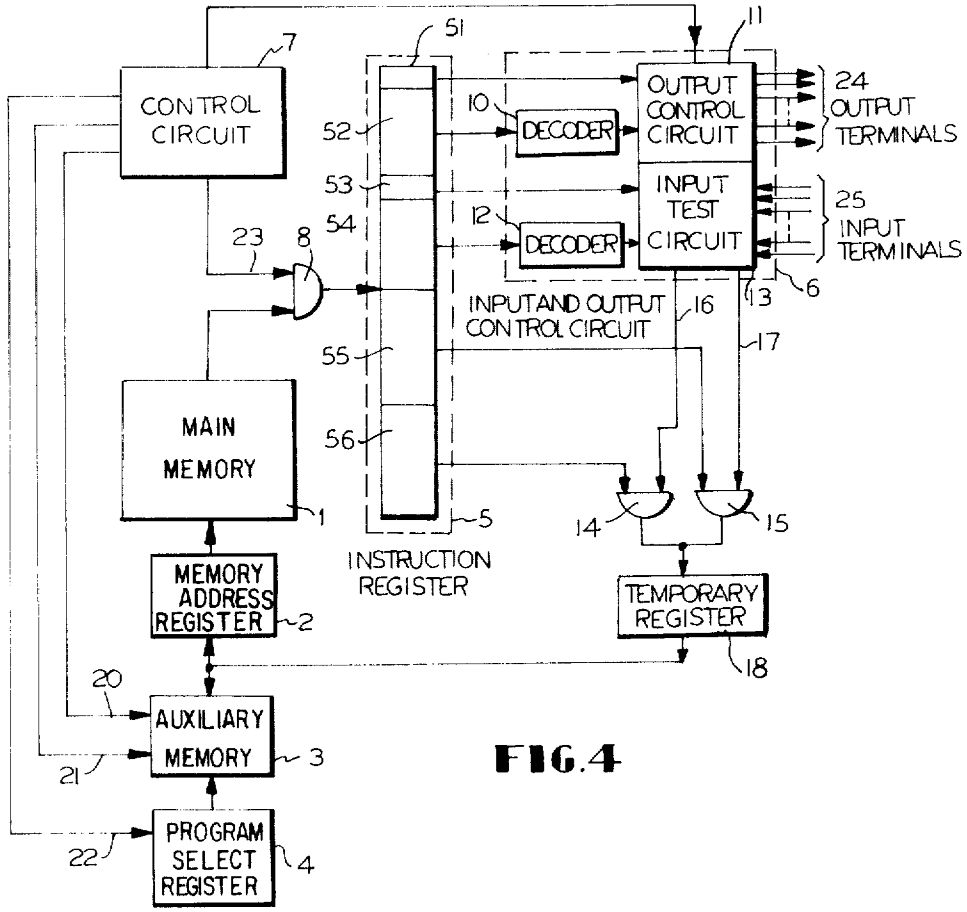
FIG. 4 is a block diagram of the programmable logic controller in accordance with the invention.

FIG. 4 is a block diagram of an embodiment of the present invention in which the instruction words shown in FIG. 2 are used. Referring to FIG. 4 the reference character 1 designated a main memory means which stores the sequence programs shown in FIGS. 3A–3C and which usually uses a read only memory such as a diode-matrix memory. The capacity of said memory means is 44 words, each word consisting of 32 bits.

A program select register means 4 is provided which is a conventional ternary counter and which has three states, each state corresponding to one of the operations of the stations A, B and C. That is, when the contents of said program select register means 4 is 0, an operation for station A is performed. In the same way, 1 corresponds to station B and 2 to station C.

An auxiliary memory means 3 is provided which is capable of reading and writing. A semiconductor RAM can be used for an address memory means 3. The word size of said auxiliary memory means 3 is three words and each word has 8 bits capacity. The address of said address memory means 3 is specified by one of the three states of said program select register means 4.

A control circuit means 7 is provided is connected to an AND gate 8 along with the output of the main memory means 1, and which is also connected to address memory means 3 and the program select register means 4. A memory address register means 2 is a conventional presettable counter is connected between the auxilliary memory means 3 and main memory means 1. The output of AND gate 8 is connected to a six part instruction register means 5. The instruction register means 5 comprising conventional flip-flops is 32 bits long as the length of the instruction word is 32 bits. The parts 51 and 52 are for the data of the output part of the instruction word, in which 51 has a 1 bit capacity and specifies the output condition, and 52 has 7 bits capacity and specifies an output terminal. In the same way, the parts 53 and 54 are for the data of the condition part of the instruction word, in which 53 has a 1 bit capacity and specifies an input condition, and 54 has 7 bits capacity and specifies an input terminal. The part 55 and 56 each have 8 bits capacity and are for the data of the address 1 part and address 2 part, respectively.

Figure 5A:
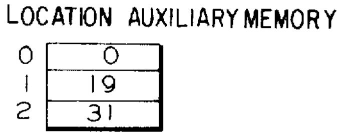
FIGS. 5A–5G show the state transition of an auxiliary memory shown in FIG. 4.

In advance of the operation of the programmable logic controller, said program select register means 4 is cleared to 0 and at addresses 0, 1 and 2 of said auxiliary memory means 3, 0, 19 and 31 are written in binary codes, respectively as shown in FIG. 5a.

The starting addresses for the operations of each station are stored in said auxiliary memory means 3. At the initiation of the operation of the programmable logic controller, the control circuit means 7 generates a read out pulse indicated at 20, and the read out pulse 20 causes the contents at address 0 of said auxiliary memory means 3 to be read out and the memory address register means 2 is set to that content, i.e., 0.

The memory address register means 2 is an 8 bit register and is used to select an address location of said main memory means 1 and to read out the contents at said address location.

With address 0 of said auxiliary memory means 1 having been selected, control circuit means 7 generates an instruction set pulse indicated at 23, and the instruction set pulse 25 causes the contents at address 0 of said main memory means 1 to be read out to the instruction register means 5 through AND gate 8.

After transfer of the contents at address 0 of said main memory means 1 to said instruction register means 5, the contents of parts 52, that is, a binary coded signal corresponding to FB is decoded by the decoder 10 and a decoded signal is fed to the output control circuit 11. Then, an output terminal corresponding to FB is selected from the group of output terminals 24, and it is energized since the contents of part 51 is 1. Also, the contents of part 54 is fed to the input test circuit 13 through the decoder 12. Then, an input terminal corresponding to the contents of part 54 is selected from the group of input terminals 25, and it is tested to determine whether it is being energized or deenergized depending upon the contents of part 53.

Figure 5B:
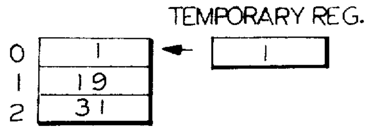

If the test result is satisfactory, said input test circuit 13 generates an address 1 set pulse indicated at 17 and the address 1 set pulse 17 causes the contents of part 55 corresponding to address 1 part to be set in the temporary register means 18 comprising conventional flip-flops through AND gate 15. If the test result is not satisfactory, said input test circuit 13 generates an address 2 set pulse 16 and the address 2 set pulse 16 causes the contents of part 56 corresponding to address 2 part to be set in said temporary register means 18 through AND gate 14. In this case, because the contents of both parts 53 and 54 are 0, said input test circuit 13 generates said address 2 set pulse indicated at 16 and the contents of part 56, that is 1, is set in said temporary register means 18. Then, said control circuit means 7 generates a write pulse indicated at 21 and the write pulse 21 causes the contents of said temporary register means 18 to be written at auxiliary 0 of said address memory means 3, as shown in FIG. 5B. And in sequence, said control circuit 7 generates a count pulse indicated at 22 and the count pulse 22 causes the state of said program select register means 4 to change from 0 to 1. Thus, address 1 of said auxiliary memory means 3 is selected.

Figure 5C:
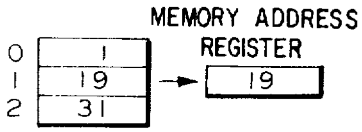
Figure 5D:
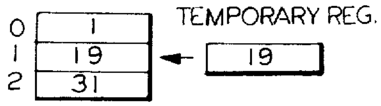
Figure 5E:
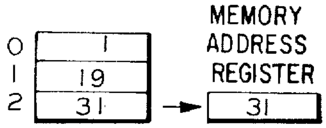
Figure 5F:
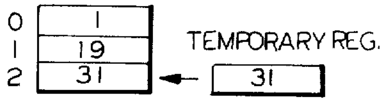
Figure 5G:
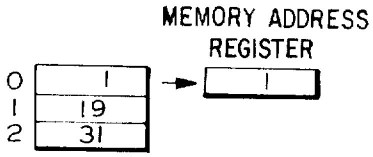
Figure 13:
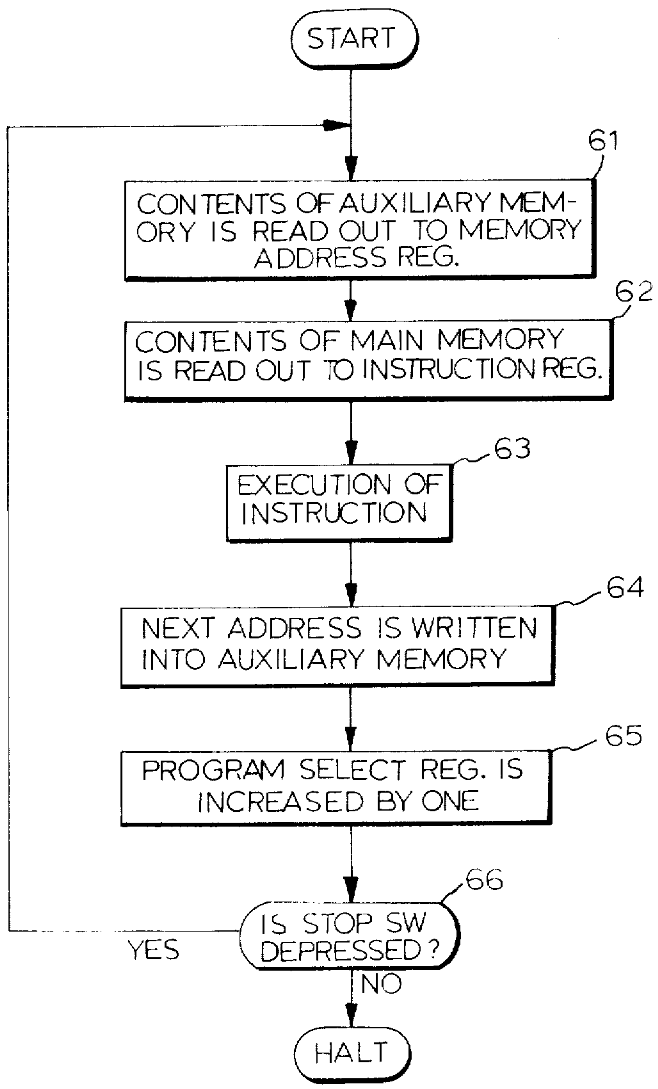
FIG. 13 is a flow diagram to illustrate the general operation of the programmable logic controller shown in FIG. 4.

Next, when said control circuit means 7 sends a read pulse 20, the contents at auxiliary 1 of said address memory means 3, that is 19, is set in said memory address register means 2, as shown in FIG. 5C. In the same way as described above, the test is made as to whether B-START is being energized or not. In this case, if the test condition is found not to be satisfied, 19 is written at address 1 of said auxiliary memory means 3, as shown in FIG. 5D. Then, the contents at auxiliary 2 of said address memory means 3 is read out as shown in FIG. 5E and the contents at address 31 of said main memory means 1 is set in said instruction register means 5. If the test condition is also found not to be satisfied, 31 is written at auxiliary 2 of said address memory means 3 again, as shown in FIG. 5F. Then the contents at address 0 of said main memory means 3 is read out as shown in FIG. 5G and the contents at address 1 of said auxiliary memory means 1 is executed. This is summarized in FIG. 13 which shows a flow diagram of the general operation.

In the same way, the sequencing operations for stations A, B and C are performed as follows: by incrementing the contents of said program select register means 4, which is carried out after the next address of a currently performed program of three programs for stations A, B and C and is stored at the corresponding location of said auxiliary memory means 3 after each execution of an instruction of said performed program, another instruction for the next program is retrieved and performed, so that instructions for three programs for stations A, B and C are sequentially retrieved and performed.

Figure 6:
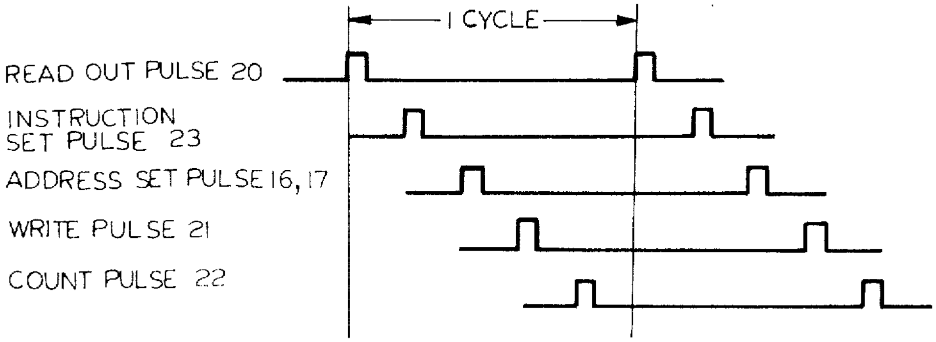
FIG. 6 shows the time relation of a timing pulse of the programmable logic controller shown in FIG. 4.

Thus, the operations for stations A, B and C are executed by scanning the instructions for three stations in time division mode. FIG. 6 shows time relation between timing pulses generated by said control circuit means 7 for easy understanding.

Figure 15A:
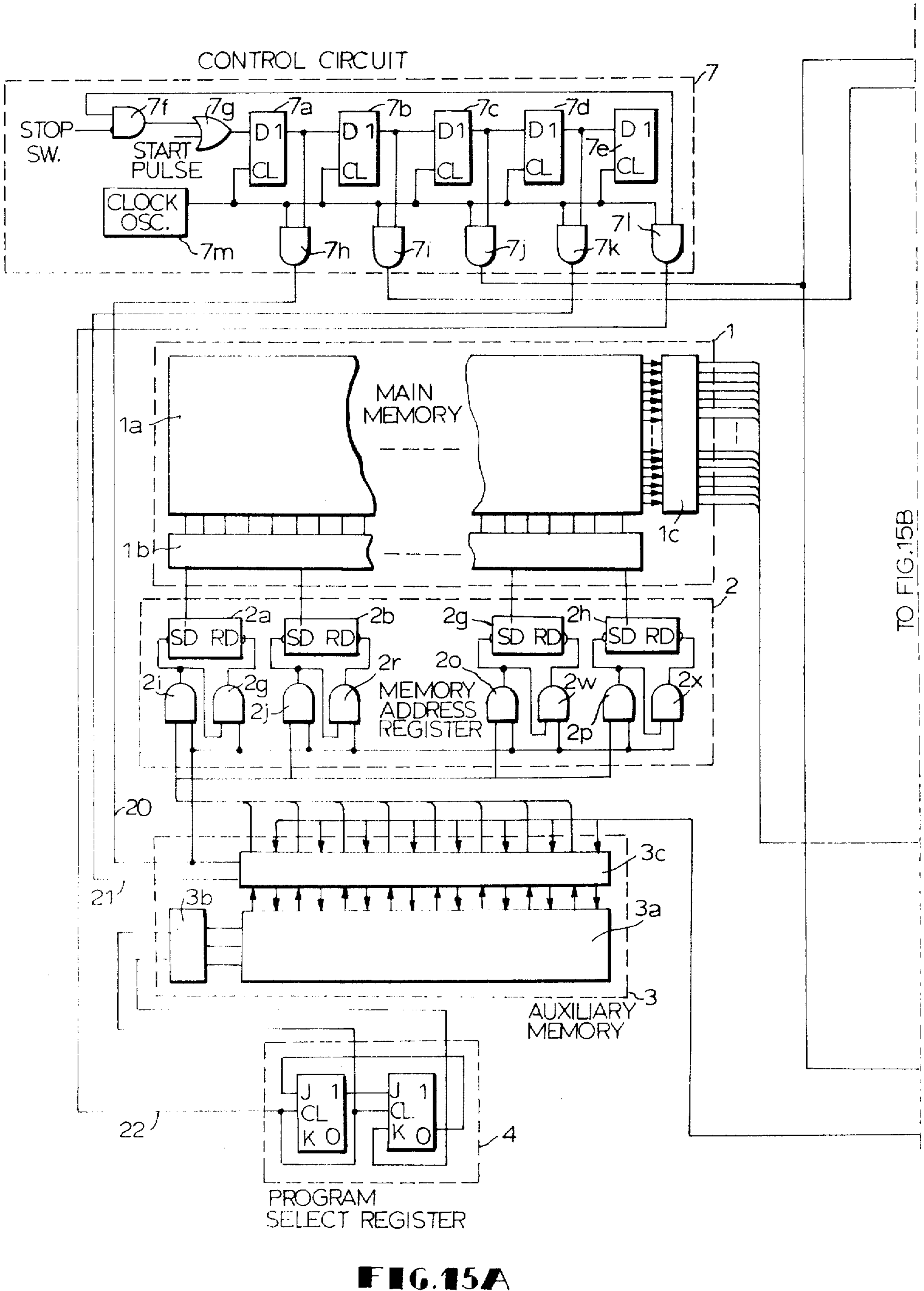
FIGS. 15a and b constitute a logic diagram of the programmable logic controller shown in FIG. 4.
Figure 15B:
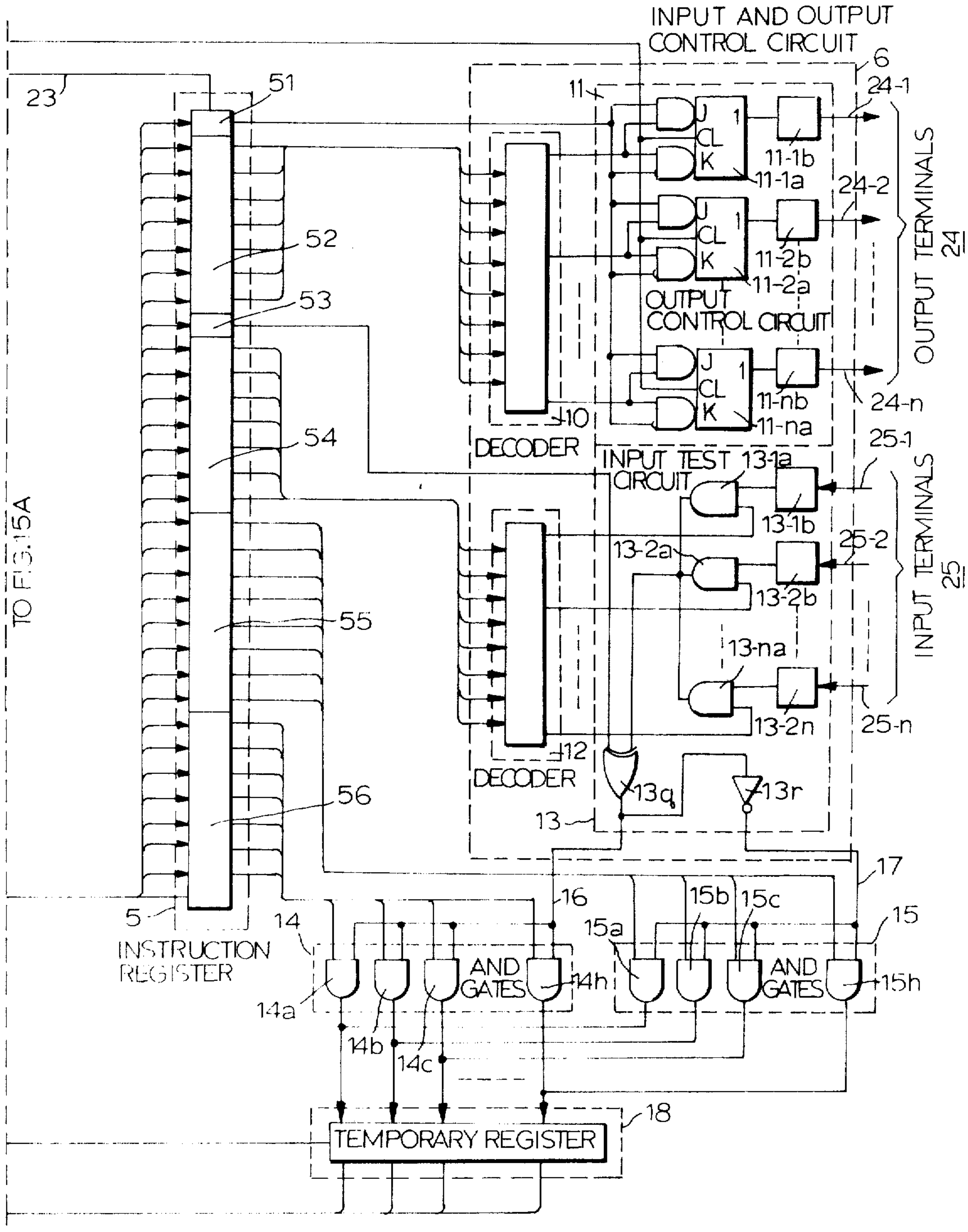

FIG. 15 shows a logic diagram corresponding to the block diagram of an embodiment of this invention shown in FIG. 4.

Referring to FIG. 15, the reference character 7 designates a control circuit means which comprises five stages of shift registers consisting of D-Flip Flops 7*a*, 7*b*, 7*c*, 7*d* and 7*e* and recirculation control gates consisting of an INHIBIT gate 7*f* and an OR gate 7*g*. A clock oscillator 7*m* supplies a clock pulse to said D-Flip Flops and AND gates 7*h*. 7*i*, 7*j*, 7*k* and 7*l*. The D-Flip Flop 7*a* is used to perform the function of block 61 in FIG. 13. In the same way, the D-Flip Flops 7*b*, 7*c*, 7*d* and 7*e* control the functions of blocks 62, 63, 64 and 65 in FIG. 13, respectively. Said INHIBIT gate 7*f* corresponds to the decision block 66 in FIG. 13. Said AND gates 7*h* through 7*l* are for distributing said clock pulse to each member of the controller.

Figure 16:
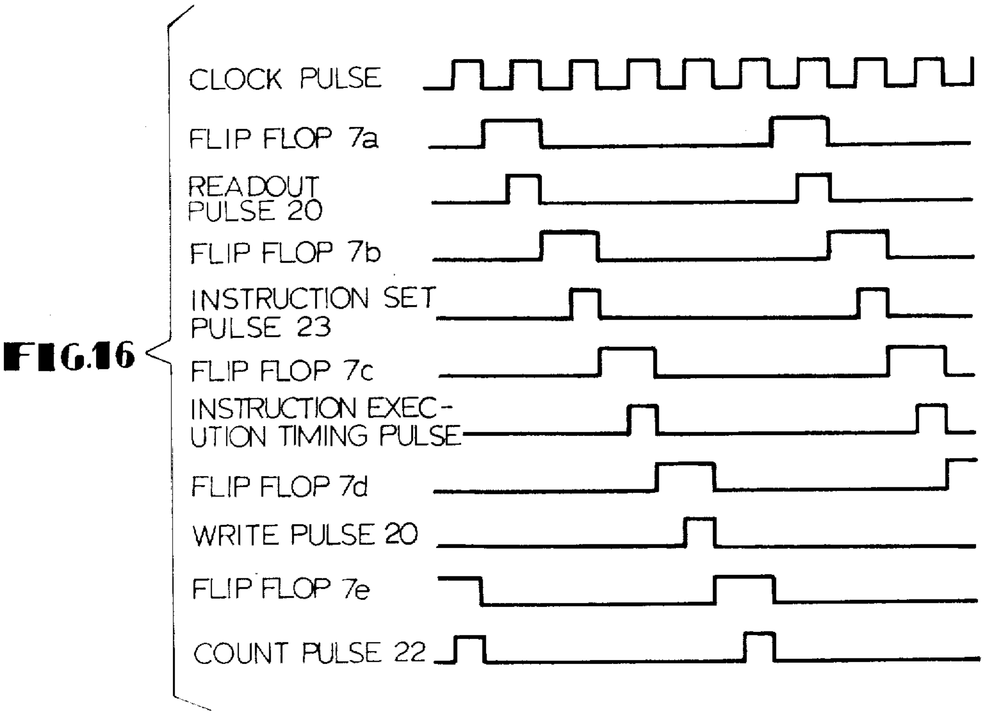
FIG. 16 is a timing diagram of the control circuit shown in FIG. 16.

FIG. 16 shows a timing diagram of said control circuit means 7.

A program select register means 4 is a conventional termary counter consisting of two JK-Flip Flops and having three states: 00, 01 and 10. Said three states of said program select register means 4 are used for selecting one of three program addresses stored in an auxiliary memory means 3. Said program select register means 4 is increased by 1 by a count pulse 22 fed from said AND gate 7 of said control circuit means 7. Said auxiliary memory means 3 is a conventional memory device which is capable of reading and writing. Said auxiliary memory means 3 comprises memory elements 3*a*, an address decoder 3*b* and an input and output interface circuit 3*c*. Said address decoder 3*b* connected to said program select register means 4 is used for selecting one of three words. Said input and output interface circuit 3*c* is a buffer between said memory elements 3*a* and external circuits. When said control circuit means 7 generates a read out pulse 20 through said AND gate 7*h*, the contents of said auxiliary memory selected by said address decoder 3*b* is read out at the output terminals of said input and output interface circuit 3*c*. When said control circuit means 7 generates a write pulse 21 through said AND gate 7*k*, the contents in a temporary register means 18 which is connected to the input terminals of said input and output interface circuit 3*c* is written into the location of said auxiliary memory means which is also selected by said program select register means 4 through said address decoder 3*b* of said auxiliary memory means 3.

The contents of said auxiliary memory means 3 selected by said program select register means 4 and read out by said read out pulse 20 is stored in a memory address register means 2. Said memory address register means 2 comprises eight direct settable and resettable FLip flops 2*a* through 2*h* and 16 NAND gates 2*i* through 2*x*. Said NAND gates 2*i* through 2*p* are for direct setting said Flip flops 2*a* through 2*h* and said NAND gates 2*q* through 2*x* are for direct resetting said Flip Flops 2*a* through 2*h*, respectively. The read out result from said auxiliary memory means 3 is stored in said memory address register means 2 with the aid of said read out pulse 20 from said control circuit means 7.

A main memory means 1 is a conventional diode-matrix read only memory, having a 44 word capacity, each word consisting of 32 bits. Said main memory means 1 comprises memory elements 1*a*, an address decoder 1*b* and output interface circuit 1*c*. Said address decoder 1*b* connected to said memory address register means 2 is used for selecting one word of said 44 words of said main memory means 1. This is, said memory address register means 2 is for addressing said main memory means 1 with the program address read out from said auxiliary memory means 3. When said memory address register means 2 receives a new data from said auxiliary memory means 3, the contents of said main memory means 1 addressed by said new data in said memory address register means 2 is available at the output terminals of said output interface circuit 1*c* after the access time of said main memory means 1. Therefore, the repetition rate of said clock pulse generated by said clock oscillator 7*m* is adjusted considering said access time of said main memory means 1.

When said control circuit means 7 generates an instruction set pulse 23 through said AND gate 7*i*, the read out contents from said main memory means 1 are stored in an instruction register means 5. Said instruction register means 5 comprises 32 D-Flip Flops clocked by said instruction set pulse 23. In the above example, said AND gate 8 in FIG. 4 is not required since D-Flip Flops are used.

An input and output control circuit means 6 comprises a decoder 10 connected to element 52 of said instruction register means 5, an output control circuit 11 connected to said decoder 10, another decoder 12 connected to element 54 of said instruction register means 5 and an input test circuit 13 connected to said another decoder 12. Said decoder 10 is for selecting one of 128 output signals connected to said output control circuit 11 as 7 bit input signals are fed to said decoder 10. Said output control circuit 11 comprises up to 128 gated JK-Flip Flops 11-1a through **11-*na* and up to 128 output voltage translators 11-1*b* through 11-*nb* having up to 128 output terminals 24-1 through 24-*n*. Each of said up to 128 output voltage translators 11-1*b* through 11-*nb* is connected to each of said up to 128 gated JK-Flip Flops 11-1*a* through 11*na* and is used for translating logic level voltage to high output voltage, for example, translating DC 5V to DC 24V. One of said up to 128 gated JK-Flip Flops is selected by said decoder 10 with the contents of said element 52 of said instruction register means 5 and is set or reset corresponding to the state of the element 51 of said instruction register means 5 when said control circuit means 7 generates an instruction execution timing pulse through said AND gate 7*j*. Therefore, one of up to 128 output connected to said up to 128 output terminals 24-1 through 24-*n*** is energized or deenergized.

Said another decoder 12 is for selecting one of 128 output signals connected to said input test circuit 13 as 7 bit input signals are fed to said another decoder 12. Said input test circuit 13 comprises up to 128 AND gates **13-1*a* through 13-1*n* and up to 128 input voltage translators 13-1*b* through 13-*nb*, each of said up to 128 AND gates 13-1*a* through 13-1*n* receives signal from each of said up to 128 input voltage translators 13-1*b* through 13-*nb*. Each of said up to 128 input voltage translators having each of up to 128 input terminals 25-1 through 25-*n* is used for translating high input voltage to logic level voltage, for example, translating DC 24V to DC 5V. One of said up to 128 AND gates 13-1*a* through 13-*na* is selected by said another decoder 12 with the contents of said part 54 of said instruction register means 5 and a test is performed to determine whether the output of said selected AND gate is coincident with the state of the element 53 of said instruction register means 5 by using an EXCLUSIVE OR gate 13*q* and an INVERTER 13*r*. That is, one of up to 128 inputs connected to said up to 128 input terminals 25-1 through 25-*n* specified by said element 54 of said instruction register means 5 is compared with the state of said element 53 of said instruction register means 5. If the test result is satisfactory, the output signal 17 of said INVERTER 13*r* becomes 1. If the test result is unsatisfactory, the output signal 16 of said EXCLUSIVE OR gate 13*q* becomes 1. When said control circuit means 7 generates said instruction execution timing pulse through said AND gate 7*j* while said test result is satisfactory, the contents of the part 55 of said instruction register means 5 is transferred to said temporary register means 18 through AND gate means 15 which comprises 8 AND gates 15-*a* through 15*h***.

When said control circuit means 7 generates said instruction execution timing pulse while said test result is unsatisfactory, the contents of the part 56 of said instruction register means 5 is transferred to said temporary register means 18 through AND gates means 14 which comprises 8 AND gates **14-*a* through 14*h***.

Said temporary register means 18 consists of 8 D-Flip Flops clocked by said instruction execution timing pulse from said control circuit means 7.

FIGS. 7A – 7D show another example of the instruction words stored in the memory of the programmable logic controller in accordance with the present invention.

Figure 7A:
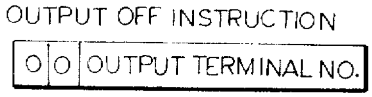
FIG. 7A–7D is another example of the instruction words stored in the main memory of the programmable logic controller in accordance with the invention.
Figure 7C:
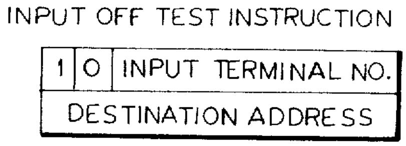
Figure 7B:
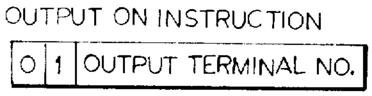
Figure 7D:
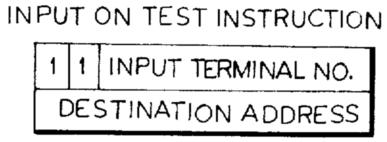

There are four instruction words, and they consist of 10 bits, respectively. Normally, the leftmost 2 bits is an operation part. FIG. 7A shows an output OFF instruction which resets a specific output to OFF. The leftmost 2 bits are 00 and the remaining 8 bits are used to specify an output terminal number. FIG. 7B shows an output ON instruction which sets a specific output to ON. This is same as the output OFF instruction shown in FIG. 7A except that the leftmost 2 bits are 01. FIGs. 7C and 7D show input TEST instructions which are two word instructions. When the leftmost 2 bits of the first instruction word are 10, a test is made as to whether a specific input is OFF. When they are 11, a test is made as to whether a specific input is ON. The remaining 8 bits of the first instruction word are used to specify an input terminal number in the same way as in FIGS. 7A and 7B. The second instruction word stores a destination address to which the program control jumps when the TEST result in response to the first instruction word is negative. The destination address consists of 10 bits and stores an absolute address information in the memory. When the TEST result in response to the first instruction word is positive, the program control skips the second instruction word and retrieves the contents of the subsequent address location. As 8 bits are used to specify an input or output terminal number, 256 input or output terminals can be specified. These instruction words shown in FIGS. 7A–7D are stored in the memory coded in a binary-code.

The sequence program for the flow-charts shown in FIGS. 1A–1C are rewritten in FIGS. 8A–8C using instruction words of the type shown in FIGS. 7A–7D. In FIGS. 8A–8C, address locations of the memory and the address parts of the two word instructions are shown in decimal numbers and input and output terminal numbers are shown in the same symbols as in FIGS. 1A–1C for the sake of convenience.

The operation part of each instruction word is also expressed in decimal numbers. That is. 00, 01, 10 and 11 are expressed in 0, 1, 2 and 3, respectively. As indicated in FIGS. 8A–8C, the sequence program of the station A is stored at addresses 0 through 37 inclusive. The sequence program of the station B is stored at addresses 38 through 63 inclusive. The sequence program of the station C is stored at addresses 64 through 93 inclusive.

Although there is no unconditional jump instruction in the instruction words in FIGS. 7A–7D, a DUMMY input terminal which is always OFF, is used for unconditional jump operations. The addresses (36, 37), (62, 63) and (92, 93) of FIGS. 8A–8C show unconditional jump instructions using the DUMMY.

Figure 9:
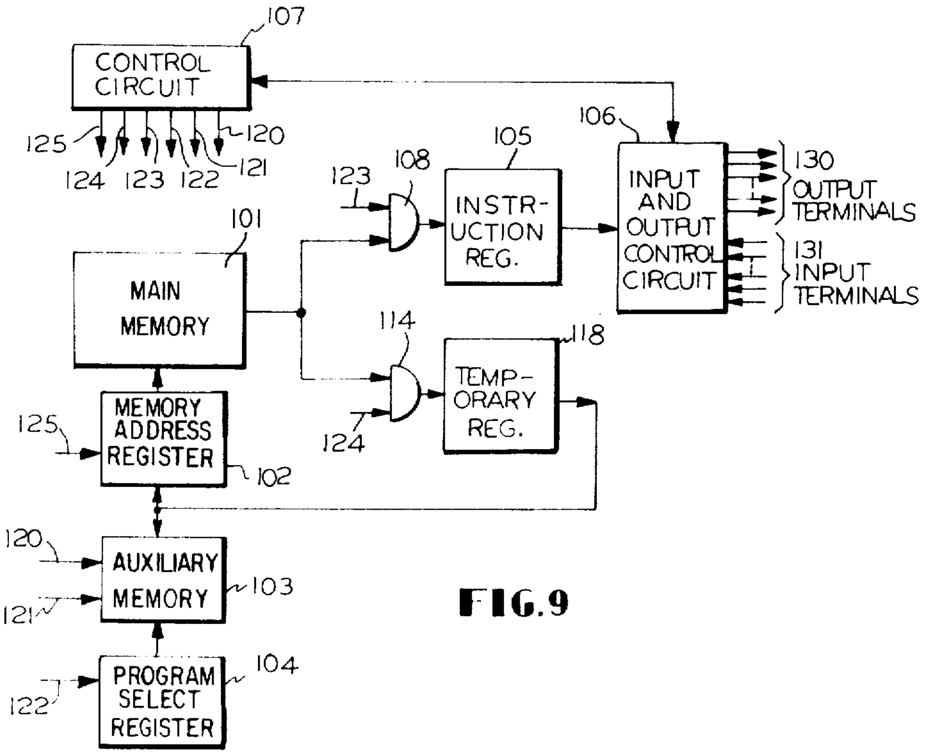
FIG. 9 is a block diagram of another programmable logic controller in accordance with the invention.

Referring to FIG. 9, the reference character 101 designates a main memory means which stores the sequence programs shown in FIG. 8A–8C and which usually uses a read only memory such as a diode-matrix memory. The memory capacity of said main memory means 101 is 94 words, each consisting of 10 bits. A program select register means 104 is provided which has three states which correspond to the operations of the stations A, B and C. That is, the contents 0 of said program select register means 104 corresponds to the operation of the station A. In the same way, contents 1 and 2 correspond to the operation of the station B and C, respectively. An auxiliary memory means 103 is coupled to the program select register means 104 and is capable of reading and writing. The memory capacity of said auxiliary memory means 103 is 3 words, each consisting of of 10 bits. The program select register means 104 specifies an auxiliary location of said address memory means 103.

The apparatus has a control circuit means 107 having a plurality of outputs 120–127 connected to the various elements, the outputs 120 and 121 being connected to the auxiliary memory means 103, and the output 122 being connected to the program select register means 104. A memory address register means 102 is coupled between the auxiliary memory means 103 and the main memory means 101, and has the output 125 from the control circuit means 107 connected thereto. The output of the main memory means 101 is supplied to two AND gates 108 and 114, the AND gate 108 also being connected to the output 123 of the control circuit means 107 and the gate 114 being connected to the output 124 of the control circuit means 107. The output of the AND gate 108 is connected to a 10 bit instruction register means 105, the output of which in turn is connected to an input and output control circuit means 106 similar to that of FIG. 4, but having 130 output terminals and 131 input terminals. The output of AND gate 114 is coupled to a 10 bits temporary register means 118, the output of which in turn is coupled to the auxiliary memory means 103 and said memory address register means 102.

Figure 10A:
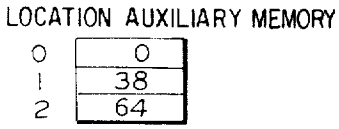
FIGS. 10A–10C show the state transition of an auxiliary memory shown in FIG. 9.

In advance of the initiation of the operation, the program select register means 104 is cleared to the 0 state, and 0, 38 and 64 are stored at addresses 0, 1 and 2 of said auxiliary memory means 103 in binary codes, respectively as shown in FIG. 10A. That is, each starting address of the sequence main for each station stored in the program memory means 101 is also stored in said auxiliary memory means 103. Because the contents of said program select register means 104 is 0 when the control circuit means 107 generates a read out pulse 120, the read out pulse 120 causes the contents of address 0 of said auxiliary memory means 103 to be read out and is temporarily stored in the memory address register means 102. Said memory address register means 102 is a 10 bits register and is used to select an address location of said main memory means 101. Therefore, address 0 of said main memory means 101 is selected since said program counter means 102 holds 0.

Said control circuit means 107 next generates an instruction set pulse 123, and the instruction set pulse 123 causes the contents of address 0 of said main memory means 101 to be transferred to an instruction register means 105 through AND gate 108. Since the instruction word is 10 bits long, the capacity of said instruction register means 105 must be 10 bits. When the contents of address 0 of said main memory means 101 is transferred to said instruction register means 105, the instruction word stored in said instruction register means 105 is interpreted by an input output control circuit means 106, and a corresponding output terminal is selected from among output terminals group 130 as the instruction register means 105 holds an output instruction. Then, said output terminal is set or reset depending on the operation part of said instruction word. In this case, an output FB is set to ON, since the operation part of the instruction word is 1.

Subsequently, said control circuit means 107 generates an address count pulse 125 which causes the contents of said program counter means 102 to increase by 1. Now, address 1 of said memory address register means 101 is selected. Next, the control circuit means 107 generates the instruction set pulse 123 and an output FC is set to ON in the same manner as described above. When the control circuit means 107 generates the instruction set pulse 123 after address 2 of said main memory means 101 is selected by the address count pulse 125, the contents of address 2 of said main memory means 101 is transferred to said instruction register means 105, and a corresponding input terminal is selected from input terminals group 131 as the instruction register means 105 holds an input TEST instruction. Then, a test is made as to whether said corresponding input is ON or OFF depending upon the operation part of the instruction word in the instruction register means 105.

Figure 10B:
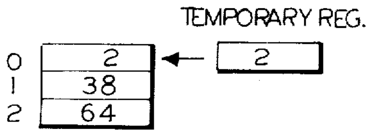

When A-START signal is in the OFF state, since the test result by the instruction at address 2 of said main memory means 101 is negative, an address count pulse 125 is generated and the contents of address 3 of said main memory means 101, i.e., the destination address 2 is selected. An address set pulse 124 is generated which causes the contents of address 3 to be set in a temporary register 118 through an AND gate 114. When said control circuit means 107 generates a write pulse 121, the write pulse 121 causes the contents of said temporary register 118, that is 2, to be written at address 0 of said auxiliary memory means 103, as shown in FIG. 10B. Then, said control circuit means 107 generates a count pulse 122 and the count pulse 122 changes the program select register means for 0 to 1 and address 1 of said auxiliary program select register means 103 is selected.

Figure 10C:
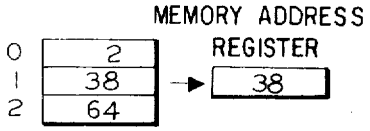

After that, when said control circuit means 107 supplies a read pulse 120, the contents at address 1 of said auxiliary memory means 103, that is 38, is set in said program counter means 102 as shown in FIG. 10C and address 38 of said main memory means 101 is selected. Therefore, the instruction stored at address 38 of said main memory means 101 is transferred to said instruction register 105 and it is executed. The instruction stored at address 38 of said main memory means 101 is an input TEST instruction. If the test result from the instruction is negative, the contents of address 39 of said main memory means 101, i.e., the destination address 38, is stored at auxiliary 1 of said address memory means 103. Thereafter the contents of said program select register means 104 becomes 2 and after a similar series of steps, it will return to 0 and the contents of auxiliary 0 of said address memory means 103, that is 2, is read out and set in said memory address register means 102. Then, the instruction stored at address 2 of said main memory means 101 is reexecuted.

Figure 14:
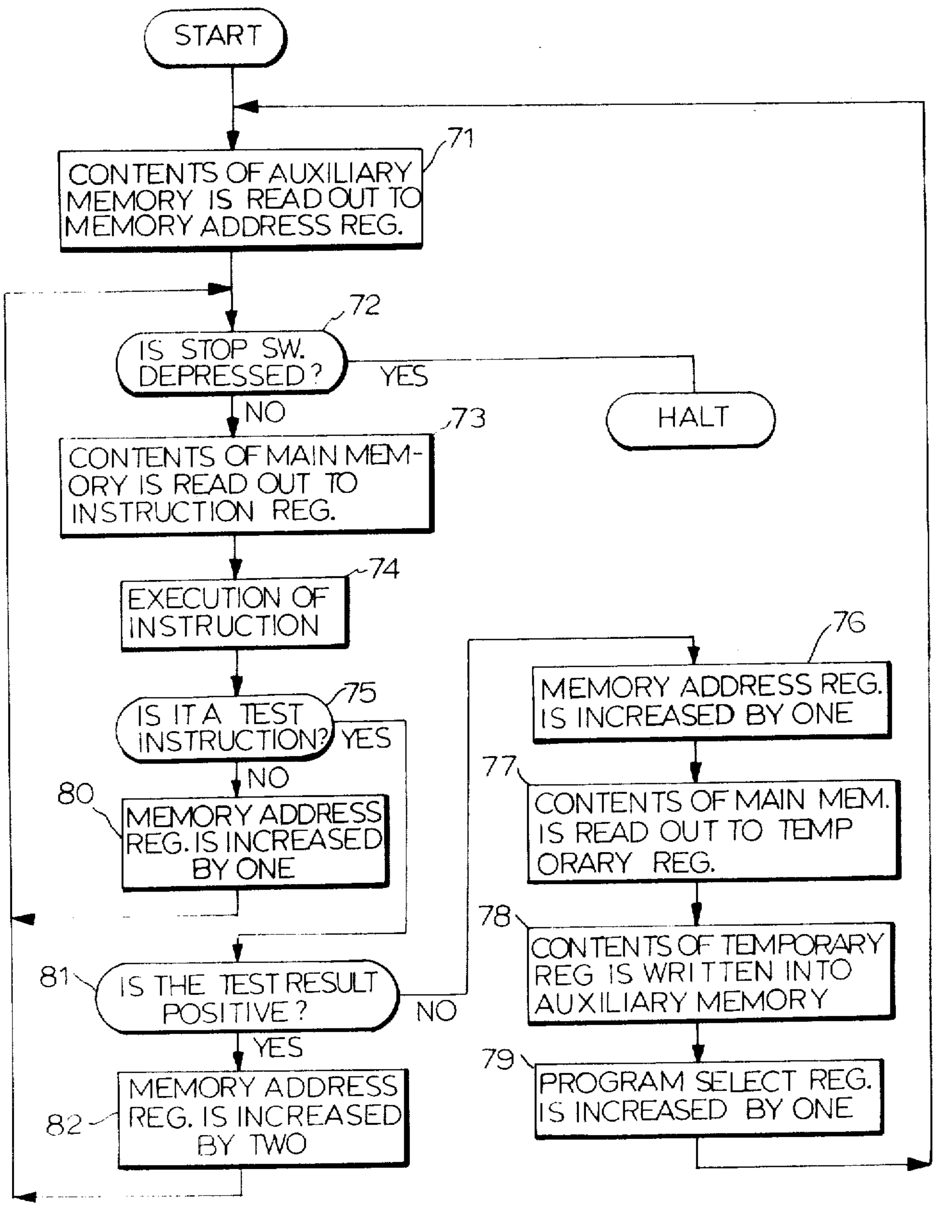
FIG. 14 is a flow diagram to illustrate the general operation of the programmable logic controller shown in FIG. 9.

If the test result from the instruction is positive, said control circuit means 107 generates address count pulse 125 twice, and the contents of address 4 of said main memory means 101 is read out and is executed. FIG. 14 shows a flow diagram of the general operation explained above.

In the same way, instructions for stations A, B and C are scanned and executed a time division mode. That is, if the test result as a result of the execution of an input TEST instruction is negative, the contents stored at the subsequent auxiliary location is written into said address memory means 103 and the instructions for the subsequent station are retrieved and executed. If the test result is positive, the instructions for the same station are repeatedly retrieved and executed until the test result as a result of the execution of an input TEST instruction for the same station is negative.

Figure 17A:
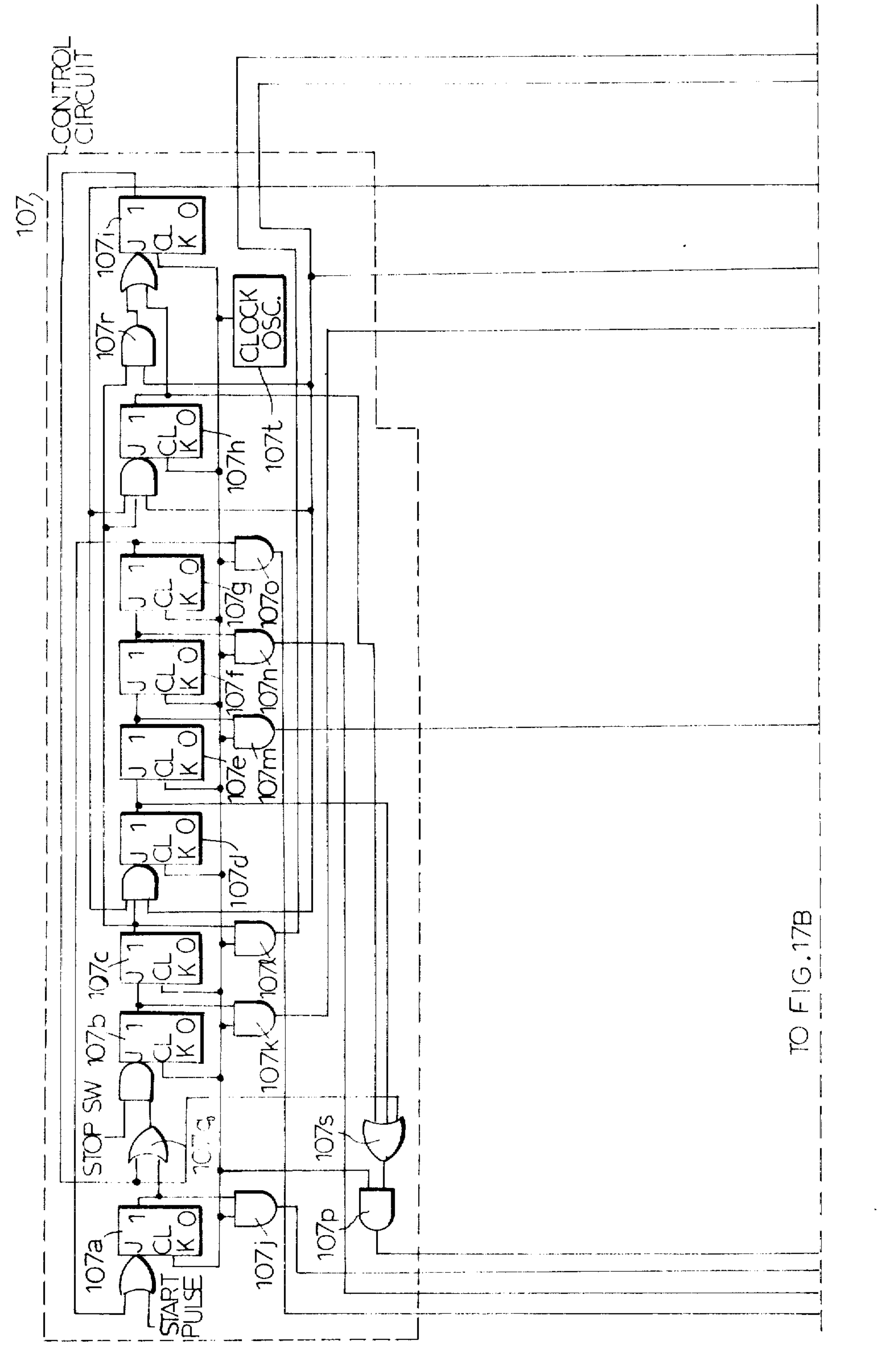
FIGS. 17a, b and c constitute a logic diagram of the programmable logic controller shown in FIG. 9.
Figure 17B:
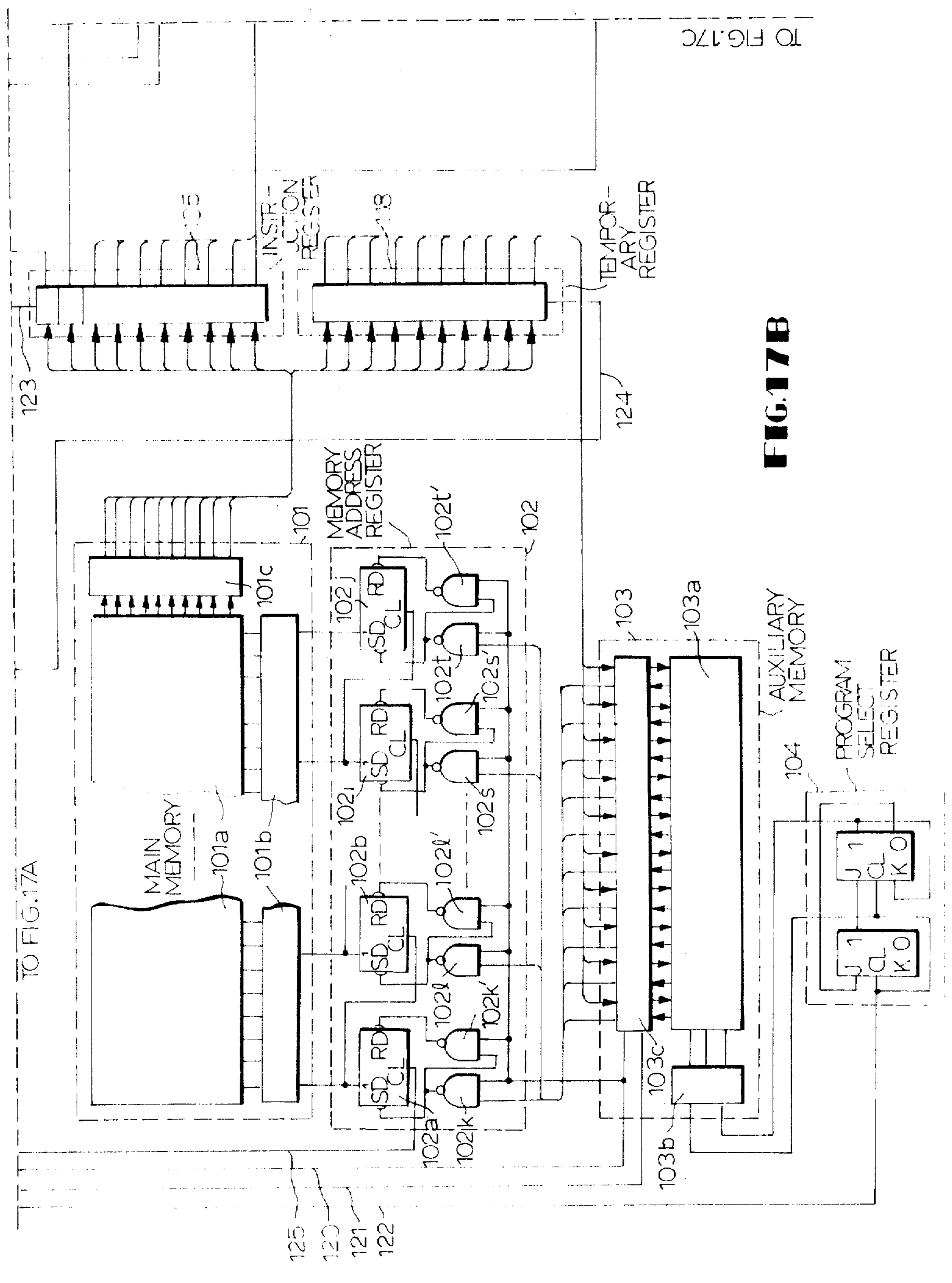
Figure 17C:
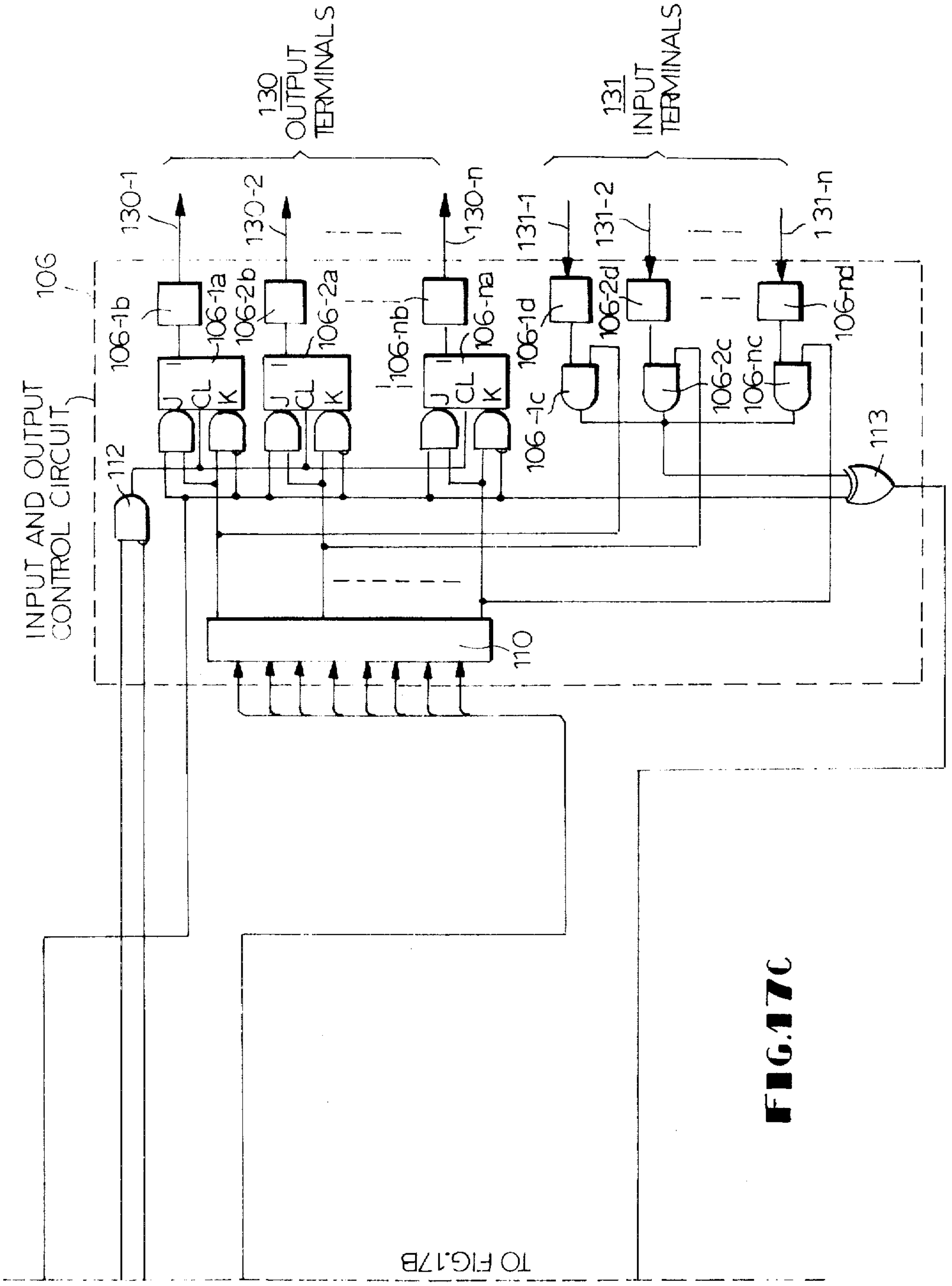

FIG. 17 is a logic diagram corresponding to the block diagram of another embodiment of this invention shown in FIG. 9.

Referring to FIG. 17, the reference character 107 designates a control circuit means including JK-Flip Flops 170*a*, 107*b*, 107*c*, 107*d*, 107*e*, 107*f*, 107*g*, 107*h* and 107*i*. A clock oscillator 107*t* supplies a clock pulse to said JK-Flip Flops 107*a* through 107*i* and AND gates 107*j*, 107*k*, 107*l*, 107*m*, 107*n*, 107*o* and 107*p*. The JK-Flip Flop 107*a* is used to perform the function of block 71 in FIG. 14. In the same way, the JK-Flip Flops 107*b*, 107*c*, 107*d*, 107*e*, 107*f*, 107*g* and 107*h* are used to perform the functions of blocks 73, 74, 76, 77, 78, 79 and 80 in FIG. 14, respectively. The block 82 in FIG. 14 is represented by the states of said JK-Flip Flops 107*h* and 107*i*. Said AND gates 107*j* through 107*p* are for distributing said clock pulse to each member of the controller.

A program select register means 104 is a conventional ternary counter consisting of two JK-Flip Flops and having three states: 00, 01 and 10. Said three states of said program select register means 104 are used for selecting one of three program addresses stored in an auxiliary memory means 103. Said program select register means 104 is increased by 1 by a count pulse 122 fed from said AND gate 107*o* of said control circuit means 107.

Said auxiliary memory means 103 is a conventional memory device which is capable of reading and writing and specifically comprises memory elements 103*a*, an address decoder 103*b* and an input and output interface circuit 103*c*. Said address decoder 103*b* connected to said program select register means 104 is used for selecting one of three words. Said input and output interface circuit 3*c* is a kind of buffer between said memory elements 103*a* and external circuits. When said control circuit means 107 generates a read out pulse 120 through said AND gate 107*j*, the contents of said auxiliary memory means selected by said address decoder 103*b* is read out at the output terminals of said input and output interface circuit 103*c*. When said control circuit means 107 generates a write pulse 121 through said AND gate 107*n*, the contents in a temporary register means 118 which is connected to the input terminals of said input and output interface circuit 103*c* is written into the location of said auxiliary memory means which is also selected by said program select register means 104 through said address decoder 103*b* of said auxiliary memory means 103.

The contents of said auxiliary memory means 103 selected by said program select register means 104 and read out by said read out pulse 120 is stored in a memory address register means 102. Said memory address register means 102 comprises 10 direct settable and resettable JK-Flip Flops 102*a* through 102*j*, 10 NAND gates 102*k* through 102*t* and 10 NAND gates 102*k*' through 102*t*'. Said NAND gates 102*k* through 102*t* are for direct setting of said Flip Flops 102 a through 102*j* and said NAND gates 102*k*' through 102*t*' are for direct resetting of said Flip Flops 102 a through 102*j*, respectively. The read out result from said auxiliary memory means 103 is stored in said memory address register means 102 with the aid of said read out pulse 20 from said control circuit means 107. When said control circuit means 107 generates an address count pulse 125 through said AND gate 107*p*, said memory address register means 102 acts as a counter and the contents of said memory address register means 102 is increased by 1 by said address count pulse 125.

A main memory means 10 is a conventional diode-matrix read only memory, the capacity of which is 94 words, each word consisting of 10 bits. Said main memory means 101 comprises memory elements 101*a*, an address decoder 101*b* and output interface circuit 101*c*. Said address decoder 101*b* connected to said memory address register means 102 is used for selecting one word of said 94 words of said main memory means 101. That is, said memory address register means 102 is for addressing said main memory means 101 with the program address read out from said auxiliary memory means 102. When the memory address register means 102 receives new data from said auxiliary memory means 103 or by said address count pulse 125, the contents of said main memory means 101 addressed by said new data in said memory address register means 102 is available at the output terminals of said output interface circuit 101*c* after the access time of said main memory means 101. Therefore, the repetition rate of said clock pulse generated by said clock oscillator 107*t* is adjusted considering said access time of said main memory means 101. When said control circuit means 107 generates an instruction set pulse 123 through said AND gate 107*k*, the read out contents from said main memory means 101 are stored in an instruction register means 105. Said instruction register means 105 comprises 10 D-Flip Flops clocked by said instruction set pulse 123. In this case, said AND gate 108 in FIG. 9 is not required as D-Flip Flops are used.

When said control circuit means 107 generates an address set pulse 124 through said AND gate 107*m*, the read out contents of said main memory means 101 are stored in said temporary register means 118. Said temporary register means 118 comprises 10 D-Flip Flops clocked by said address set pulse 124. In the same way as said instruction register means 105, the requirement for said AND gate 114 in FIG. 9 is obviated.

An input and output control circuit means 106 comprises a decoder 110 connected to the input and output terminal number part of said instruction register means 105, an output control circuit connected to said decoder 110 and input test circuit connected to said decoder 110. Said decoder 110 is for selecting one of 256 output signals connected to said output control circuit as 8 bits input singals are fed to said decoder 110. Said output control circuit comprises up to 256 gated JK-Flip Flops 106-1*a* through 106-*na* and up to 256 output voltage translators 106-1*b* through 106-*nb* having up to 256 output terminals 130-1 through 130-*n*. Each of said up to 256 output voltage translators 106-1*b* through 106-*nb* is connected to each of said up to 256 gated JK-Flip Flops 106-1*a* through 106-*na* and is used for translating logic level voltage to high output voltage, for example, translating DC 5V to DC 24V. One of said up to 256 gated JK-Flip Flops is selected by said decoder 110 with the contents of said input and output terminal number part of said instruction register means 105 and is set or reset corresponding to the state of the operation part of said instruction register means 105 when said control circuit means 107 generates an instruction execution timing pulse through said AND gate 107*l*. Therefore, one of up to 256 outputs connected to said up to 256 output terminals 130-1 through **130-*n*** is energized or deenergized.

Said decoder 110 is also for selecting one of 256 output signals connected to said input test circuit as 8 bits input signals are fed to said decoder 110. Said input test circuit comprises up to 256 AND gates **106-1*c* through 106-*nc* and up to 256 input voltage translators 106-1*d* through 106-*nd*, each of said up to 256 AND gates 106-1*c* through 106-*nc* receives signal from each of said up to 256 input voltage translators 106-1*d* through 106-*nd*. Each of said up to 256 input voltage translators having each of up to 256 input terminals 131-1 through 131-*n*, is used for translating high input voltage to logic level voltage, for example, translating DC 24V to DC 5V. One of said up to 256 AND gates 106-1*c* through 106-*nc* is selected by said decoder 110 with the contents of said input and output terminal number part of said instruction register means 105, and it is tested to determine whether the output of said selected AND gate is coincident with the state of said operation part of said instruction register mans 105 by using an EXCLUSIVE OR gate 113. That is, one of up to 256 inputs connected to said up to 256 input terminals 131-1 through 131-*n* specified by said input and output terminal number part of said instruction register means 105 is compared with said state of said operation part of said instruction register means 105. If the test result is satisfactory, the output sginal of said EXCLUSIVE OR gate 113 becomes 0. If the test result is unsatisfactory, said output signal of said EXCLUSIVE OR gate 113 becomes 1.**

Figure 11:
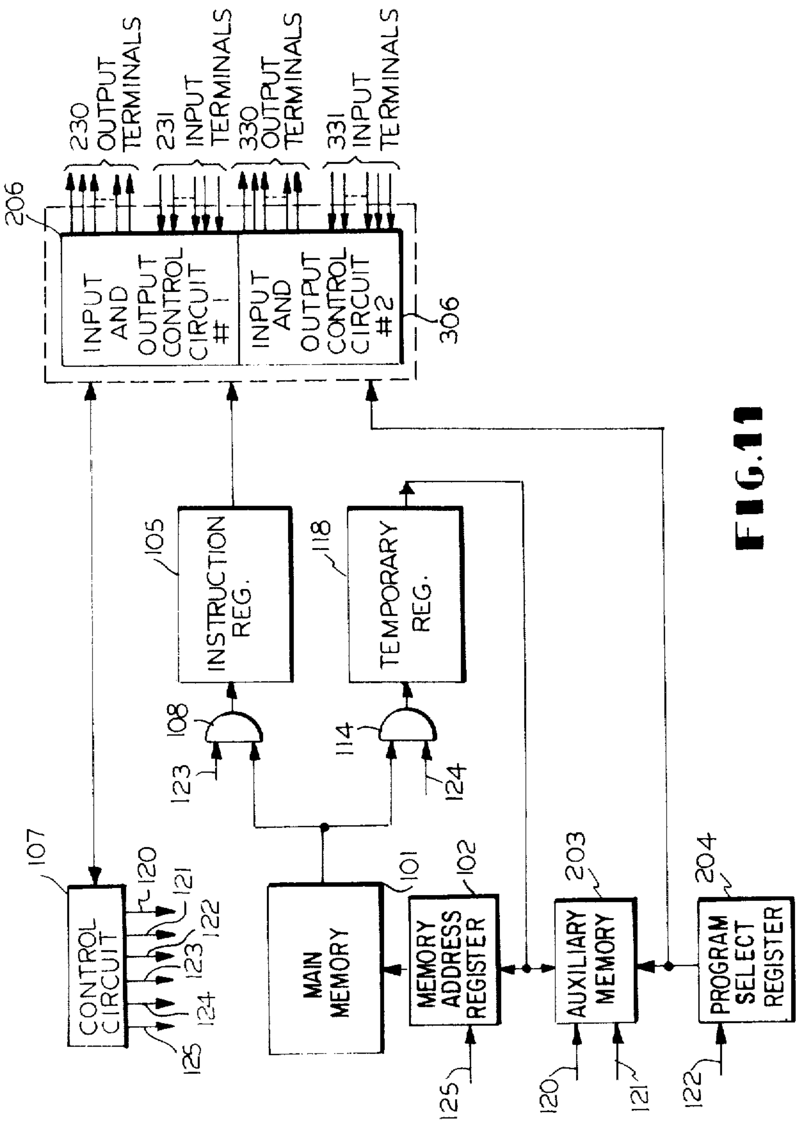
FIG. 11 is a block diagram of a further programmable logic controller in accordance with the invention.

FIG. 11 shows a further embodiment of the present invention which is similar in arrangement to FIG 9. Referring to FIG. 11, the reference character 101 designates a main memory means which stores the sequence programs shown in FIGS. 8A–8C. The memory capacity of said main memory means 101 is 94 words, each word consisting of 10 bits. A program select register means 204 is provided which has 6 states. In this case, two identical devices, each having three stations A, B and C are controlled by one programmable controller. In the following description, the three stations A, B and C for the first controlled device are designated as A0, BO and C0, respectively. The three stations A, B and C for the second controlled device are designated as A1, B1, and C1, respectively. The contents 0 of said program select register means 204 corresponds to the operation of the station A0. In the same way, 1, 2, 3, 4 and 5 correspond to the operations of the stations A1, B0, B1, C0 and C1, respectively. An auxiliary memory 203 is provided which has a memory capacity of 6 words, each word consisting of 10 bits. Access is gained to the address locations of said auxiliary memory means 203 by any one of six states 0, 1, 2, 3, 4 and 5 of said program select register means 204.

Figure 12A:
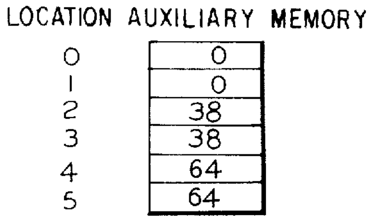
FIGS. 12A–12E show the state transistion of a further auxiliary memory shown in FIG. 11.
Figure 12B:
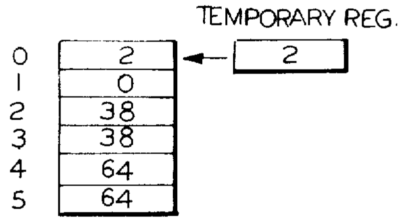

Before the programmable logic controller starts operation, the contents of said program select register means 204 is cleared to the 0 state and initial data 0, 0, 38, 38, 64 and 64 are stored in binary form at addresses 0, 1, 2, 3, 4 and 5 of said auxiliary memory means 203, respectively as shown in FIG. 12A. That is the starting address of each sequence program for each station stored in said main memory means 101 is stored in said auxiliary memory means 203.

When said control circuit means 107 generates a read out pulse 120, because the contents of said program select register means 204 is 0, the contents at address 0 of said auxiliary memory means 103 are read out and the contents 0 at address 0 are set in said memory address register means 102. Said memory address register means 102 is a 10 bit register and is used to select an address of said main memory means 101 and to read out the contents at said address.

When said control circuit means 107 generates an instruction set pulse 123, address 0 of said main memory means 101 is selected, the contents at address 0 of said main memory means 101 are set in an instruction register means 105 through the AND gate 108. Said instruction register means 105 is a 10 bits register, since the instruction word is 10 bits long.

The instruction signal, which is transferred from address 0 of said main memory means 101 into said instruction register means 105, is interpreted by two input and output control circuit means 206 and 306. A corresponding output terminal is selected in output terminal group 230 or 330 depending on the contents of said program select register means 204, and the selected output terminal is set or reset depending on the operation part of said instruction signal. In this case, the input and output control circuit means are such that when the contents of said program select register means 204 is an even number, the operations of stations A0, B0 and C0 for the first controlled device are specified. An odd number specifies the operation for the second controlled device, A1, B1 and C1. Now, as the operation part is 1, FB for the first controlled device is set to the ON condition.

Next, said control circuit means 107 generates an address count pulse 125, and the contents of said memory address register means 102 is increased by one. So, address 1 of said main memory means 101 is selected, and FC for the first controlled device is set to the ON condition after the generation of an instruction set pulse 123, in the same way as the operation at address 0. And subsequently, when said instruction set pulse 123 is generated after address 2 of said main memory means 101 is selected by said address count pulse 125, because the contents of said program select register means 204 is still 0 and the operation part is an input TEST instruction, a specific input terminal is selected from input terminal group 231. Then, a test is made as to whether said specific input is ON or OFF depending upon the operation part of the instruction. If A-START signal for the first controlled device is OFF, because the test result from the instruction at address 2 is negative, address 3 of said main memory means 101 is selected as a result of generation of an address count pulse 125. The contents at address 3, i.e., the destination address 2, are set in temporary register means 118 through the AND gate 114 by generation of an address set pulse 124.

When said control circuit 107 next generates a write pulse 121, the contents of said temporary register means 118, that is 2, is written at address 0 of said auxiliary memory means 203. After that, said program select register means 204 changes state from 0 to 1 as a result of a count pulse 122 from said control circuit means 107, and address 1 of said auxiliary memory means 203 is selected. At this time, the contents of said program select register means 204 become an odd number, and so the control operation for the second controlled device is executed in the following time period, through input and output control circuit means 306.

Figure 12C:
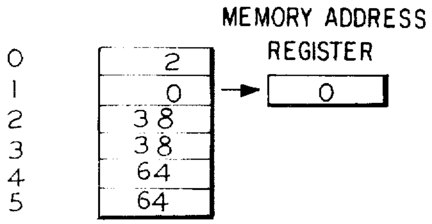

The contents of address 1 of said auxiliary memory means 203, that is 0, are set in said memory address register means 102 by a read out pulse 120 fed from said control circuit means 107, as shown in FIG. 12C and the instruction stored at address 0 of said main memory means 101 is executed in response to said instruction set pulse 123.

Figure 12D:
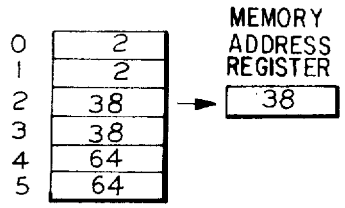
Figure 12E:
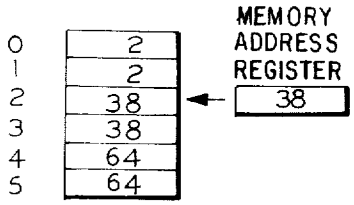

The control operations for the second controlled device are carried out in the same way as the control operations for the first controlled device. Next, when said control circuit 107 generates a count pulse 122, said program select register means 204 changes state from 1 to 2, and address 2 of said auxiliary memory means 203 is selected. The contents at address 2 of said auxiliary memory means 203, that is 38, are transferred to said memory address register means 102 as a result of a read out pulse 120 fed from said control circuit means 107, as shown in FIG. 12D and the instruction stored at address 38 of said main memory means 101 is executed in response to the instruction set pulse 123. If the test result is negative, the contents at address 39 of said main memory means 101, i.e., 38, is stored at address 2 of said auxiliary memory means, 203 as shown in FIG. 12E. In the same way, the control operations for the first controlled device and the second controlled device are carried out alternatively.

When the contents of said program select register means 204 returns to 0, 2 is set in said memory address register means 102 and the instruction stored at address 2 of said main memory means 101 is executed. If the test result from the instruction at address 2 is positive, said control circuit 107 generates address count pulse 125 twice, and the contents at address 4 of said main memory means 101 is retrieved and executed. In the same way, the operations for stations A0, A1, B0, B1, C0 and C1 are scanned and executed in time division mode. Therefore, if the test result from the execution of an input TEST instruction is negative, the next instruction address is stored in said auxiliary memory means 203 and the instructions for the next station are retrieved and executed. If the test result is positive, further instructions for the same station are retrieved and executed until the test result for that station becomes negative.

Figure 18A:
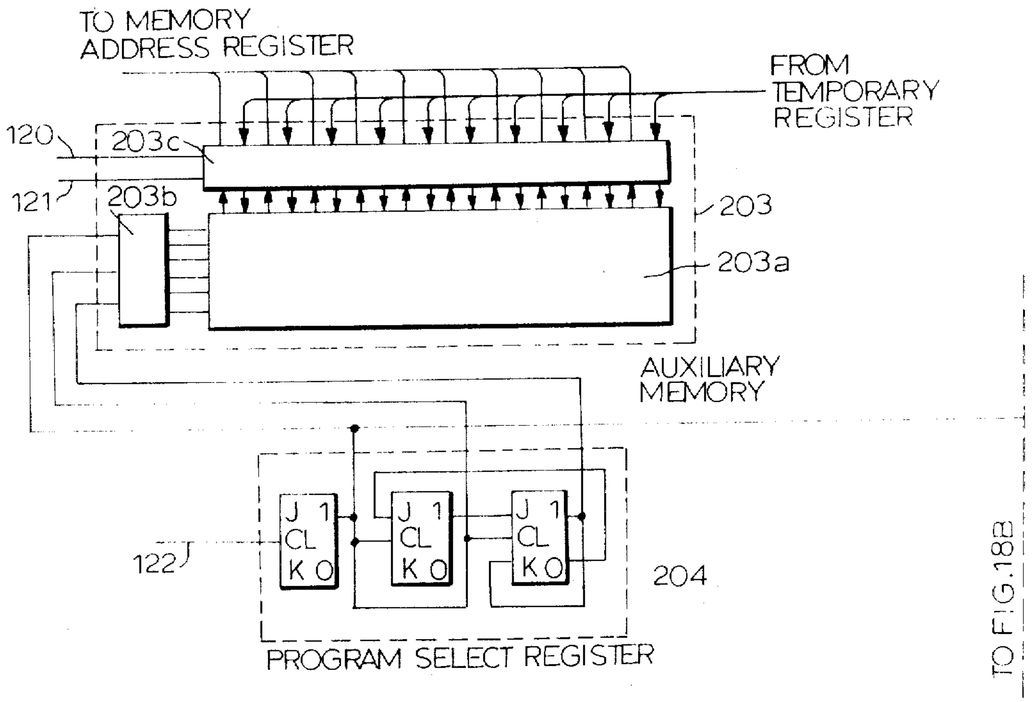
FIGS. 18a and b constitute a logic diagram of the programmable logic controller shown in FIG. 11.
Figure 18B:
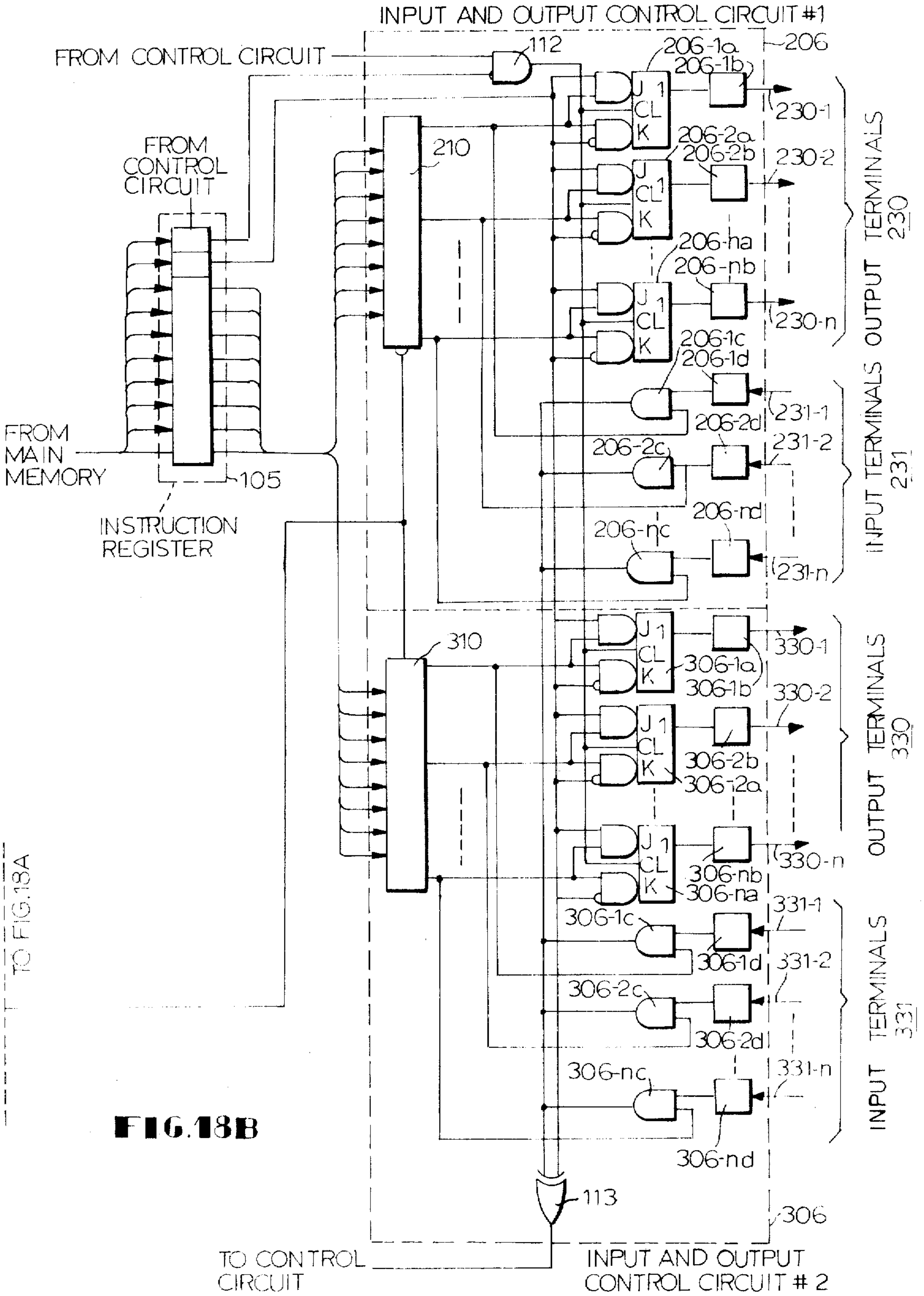

FIG. 18 shows a logic diagram corresponding to the block diagram of a further embodiment of the invention as shown in FIG. 11. But in FIG. 18, a main memory means 101, a temporary register means 118 and a control circuit means 107 are omitted because they are the same as those shown in FIG. 17.

Referring to FIG. 18, a program select register means 204 is a conventional modulo six counter consisting of three JK-Flip Flops and having six states: 000, 001, 010, 011, 100 and 101. Said six states of said program select register means 204 are used for selecting one of six programs addresses stored in an auxiliary memory means 203. In this case, the rightmost bit of said six states is used for selecting one of two controlled devices. Said program select register means 204 is also increased by 1 by a count pulse 122 from said control circuit means 107. Said auxiliary memory means 203 is also a conventional memory device. The capacity of said auxiliary memory means 203 is six words, each word consisting of 10 bits.

In FIG. 18, two input and output control circuit means 206 and 306 are shown. Each input and output control circuit means has decoder 210 or 310 and the lowest bit of said program select register means 204 is used for selecting one of said two decoders 210 and 310. Thus, two identical devices, each having three stations A, B and C are controlled by one controller.

In the above example, when the test result for a station is negative, the instructions for the next station are retrieved and executed. But, it is the same concept that when the test result for a station is satisfied, the instructions for the next station are retrieved and executed.

Generally speaking, input and output devices connected to such a programmable controller have a slow speed of operation compared with the data processing speed of such a programmable controller. Therefore, there is no problem in practical application even if inputs and outputs for multistations are scanned and controlled in time division mode as explained above.

In the above example, the operation for a controlled device having three stations is explained. However, according to the present invention, a sequence program for a controlled device can be divided into several subprograms where there are several stations in the controlled device and a subroutine program such as a program for repeating the same operation can be regarded and used as a sub-program for one station as explained above. As mentioned above, a programmable logic controller in accordance with the present invention has a simple construction and facilitates programming for complex sequencing operations since a sequence program can be divided into several blocks of subprograms. Moreover, a programmable logic controller in accordance with the present invention facilitates parallel operations of a plurality of controlled devices by using a set of sequence programs for one controlled device.

It will be understood that the above description of the present invention can be subject to various modifications, changes and adaptations, and the same are intended to be within the meaning and range of equivalents of the appended claims

What is claimed is:

1. A programmable logic controller for controlling a device having at least one input and at least one output comprising:

main memory means for storing a plurality of programs, each of said plurality of programs consisting of a sequence of instructions, each instruction comprising an output part, an input part and two destination address parts;

auxiliary memory means for storing a plurality of program addresses corresponding to said plurality of programs;

program select register means operatively connected to said auxiliary memory means for selecting one of said plurality of program addresses stored in said auxiliary memory means;

address reading means operatively connected to said auxiliary memory means for reading out the program address in said auxiliary memory means selected by said program select register means;

memory address register means operatively connected to said main memory means and to said auxiliary memory means for addressing said main memory means with said program address read out by said address reading means;

instruction reading means operatively connected to said main memory means for reading out the instruction in said main memory means addressed by said memory address register means;

instruction register means operatively connected to said main memory means for storing said instruction read out by said instruction reading means;

input and output control circuit means operatively connected to said instruction register means and to said device and having a plurality of input terminals to which said at least one input of said device is connected and a plurality of output terminals to which said at least one output of said device is connected, said input and output control circuit means including a decoder means operatively connected to said instruction register means for selecting one of said plurality of output terminals specified by said output part of said instruction stored in said instruction register means, means operatively connected to said decoder means for energizing and deenergizing the output connected to the output terminal selected by said decoder means in accordance with said output part of said instruction stored in said instruction-register means, a second decoder means operatively connected to said instruction register means for selecting one of said plurality of input terminals specified by said input part of said instruction stored in said instruction register means, comparing means operatively connected to said second decoder means for comparing the input connected to the input terminal selected by said second decoder means with the condition specified by said input part of said instruction stored in said instruction register means, and selecting means, connected to said comparing means and responsive to the result of the comparison for selecting one of two destination address parts of said instruction in said instruction register means depending upon said result of said comparison;

destination address reading means operatively connected to said instruction register means and to said selecting means for reading out the destination address part of said instruction stored in said instruction register means selected by said selecting means;

temporary register means operatively connected to said instruction register means for storing said destination address part read out by said destination address reading means;

writing means operatively connected to said auxiliary memory means for writing said destination address part in said temporary register means into the same location of said auxiliary memory means from which said program address was read out by said address reading means; and means operatively connected to said program select register means for causing said program select register means to select a different program address after said destination address is written into said auxiliary memory means by said writing means.

2. A programmable logic controller for controlling a plurality of devices each of said plurality of devices having at least one input and at least one output comprising:

main memory means for storing a plurality of programs, each of said plurality of programs consisting of a sequence of instructions, each instruction comprising an output part, an input part and two destination address parts;

auxiliary memory means for storing a plurality of sets of program addresses corresponding to said plurality of devices, each of said sets, of program addresses corresponding to said plurality of programs stored in said main memory means;

program select register means operatively connected to said auxiliary memory means for selecting one program address of said plurality of sets of program addresses stored in said auxiliary memory means;

address reading means operatively connected to said auxiliary memory means for reading out the program address in said auxiliary memory means selected by said program select register means;

memory address register means operatively connected to said main memory means and to said auxiliary memory means with said program address read out by said address reading means;

instruction reading means operatively connected to said main memory means for reading out the instruction in said main memory means addressed by said memory address register means;

instruction register means operatively connected to said main memory means for storing said instruction read out by said instruction reading means;

a plurality of input and output control circuit means of operatively connected to said instruction register means and to said plurality of devices, each having a plurality of input terminals to which said at least one input of each of said plurality of devices is connected and a plurality of output terminals to which said at least one output of each of said plurality of devices is connected, each of said plurality of input and output control means including a decoder means operatively connected to said instruction register means and to said program select register means for selecting one of said plurality of output terminals of each of said plurality of devices specified by said output part of said instruction in said instruction register means, said decoder means for each of said plurality of devices being selectively activated by said program select register means, means operatively connected to said decoder means for energizing and deenergizing the output connected to the output terminal selected by said decoder means in accordance with said output part of said instruction in said instruction register means, a second decoder means operatively connected to said instruction register means and to said program select register means for selecting one of said plurality of input terminals of each of said plurality of devices specified by said input part of said instruction in said instruction register means and comparing means operatively connected to said second decoder means for comparing the input connected to the input terminal selected by said second decoder means with the condition specified by said input part of said instructions in said instruction register means;

selecting means connected to said comparing means and responsive to the result of the comparison for selecting one of two destination address parts of said instruction in said instruction register means depending upon said result of said comparison;

destination address reading means operatively connected to said instruction register means and to said selecting means for reading out the destination address part in said instruction stored in said instruction register means selected by said selecting means;

temporary register means operatively connected to said instruction register means for storing said destination address part read out by said destination address reading means;

writing means operatively connected to said auxiliary memory means for writing said destination address part in said temporary register means into the same location of said auxiliary memory means from which said program address was read out by said address reading means; and means operatively connected to said program select register means for causing said program select register means to select a different program address after said destination address is written into said auxiliary memory means by said writing means.

3. A programmable logic controller for controlling a device having at least one input and at least one output comprising:

main memory means for storing a plurality of programs, each of said plurality of programs consisting of a sequence of instructions including input and output instructions and destination addresses;

auxiliary memory means for storing a plurality of program addresses corresponding to said plurality of programs;

program select register means operatively connected to said auxiliary memory means for selecting one of said plurality of program addresses stored in said auxiliary memory means;

address reading means operatively connected to said auxiliary memory means for reading out the program address in said auxiliary memory means selected by said program select register means, memory address register means operatively connected to said main memory means and to said auxiliary memory means for addressing said main memory means with said program address read out by said address reading means;

instruction reading means operatively connected to said main memory means for reading out the input and output instruction in said main memory means addressed by said memory address register means;

instruction register means operatively connected to said main memory means for storing said input and output instruction read out by said instruction reading means;

input and output control circuit means operatively connected to said instruction register means and to said device and having a plurality of input terminals to which said at least one input of said device is connected and a plurality of output terminals to which said at least one output of said device is connected, said input and output control circuit means including a decoder means operatively connected to said instruction register means for selecting one of said plurality of output terminals specified by an output instruction in said instruction register means, means operatively connected to said decoder means for energizing and deenergizing output connected to the output terminal selected by said decoder means in accordance with said output instruction in said instruction register means, a second decoder means operatively connected to said instruction register means for selecting one of said plurality of input terminals specified by an input instruction in said instruction register means, comparing means operatively connected to said second decoder means for comparing the input connected to the input terminal selected by said second decoder means with the condition specified by said input instruction in said instruction register means;

address modifying means operatively connected to said memory address register means for modifying said program address in said memory address register means;

destination address reading means operatively connected to said main memory means for reading out the destination address in said main memory means addressed by said memory address register means;

temporary register means operatively connected to said main memory means for storing said destination address read out by said destination address reading means;

writing means operatively connected to said auxiliary memory means for writing said destination address in said temporary register means into the same location of said auxiliary memory means from which said program address was read out by said address reading means;

means operatively connected to said program select register means for causing said program select register means to select a different program address after said destination address is written into said auxiliary memory means by said writing means: and program control means coupled to said comparing means and responsive to the result of the comparison by said comparing means for modifying said program address in said memory address register means so as to skip to read out said destination address in said main memory means only when said result of said comparison is satisfactory.

4. A programmable logic controller for controlling a device having at least one input and at least one output comprising:

main memory means for storing a plurality of programs, each of said plurality of programs consisting of a sequence of instructions including input and output instructions and destination addresses;

auxiliary memory means for storing a plurality of program addresses corresponding to said plurality of programs;

program select register means operatively connected to said auxiliary memory means for selecting one of said plurality of program addresses stored in said auxiliary memory means;

address reading means operatively connected to said auxiliary memory means for reading out the program address in said auxiliary memory means selected by said program select register means;

memory address register means operatively connected to said main memory means and to said auxiliary memory means for addressing said main memory means with said program address read out by said address reading means;

instruction reading means operatively connected to said main memory means for reading out the input and output instruction in said main memory means addressed by said memory address register means;

instruction register means operatively connected to said main memory means for storing said input and output instruction read out by said instruction reading means;

input and output control circuit means operatively connected to said instruction register means and to said device and having a plurality of input terminals to which said at least one input of said device is connected and a plurality of output terminals to which said at least one output of said device is connected, said input and output control circuit means including a decoder means operatively connected to said instruction register means for selecting one of said plurality of output terminals specified by an output instruction in said instruction register means, means operatively connected to said decoder means for energizing and deenergizing output connected to the output terminal selected by said decoder means in accordance with said output instruction in said instruction register means, a second decoder means operatively connected to said instruction register means for selecting one of said plurality of input terminals specified by an input instruction in said instruction register means, comparing means operatively connected to said second decoder means for comparing the input connected to the input terminal selected by said second decoder means with the condition specified by said input instruction in said instruction register means;

address modifying means operatively connected to said memory address register means for modifying said program address in said memory address register means;

destination address reading means operatively connected to said main memory means for reading out the destination address in said main memory means addressed by said memory address register means;

temporary register means operatively connected to said main memory means for storing said destination address read out by said destination address reading means;

writing means operatively connected to said auxiliary memory means for writing said destination address in said temporary register means into the same location of said auxiliary memory means from which said program address was read out by said address reading means;

means operatively connected to said program select register means for causing said program select register means to select a different program address after said destination address is written into said auxiliary memory means by said writing means: and program control means coupled to said comparing means and responsive to the result of the comparison by said comparing means for modifying said program address in said memory address register means so as to skip to read out said destination address in said main memory means only when said result of said comparison is unsatisfactory.

5. A programmable logic controller for controlling a plurality of devices, each of said plurality of devices having at least one input and at least one output comprising:

main memory means for storing a plurality of programs, each of said plurality of programs consisting of a sequence of instructions including input and output instructions and destination addresses;

auxiliary memory means for storing a plurality of sets of program addresses corresponding to said plurality of devices, each of said sets of program addresses corresponding to said plurality of programs stored in said main memory means;

program select register means operatively connected to said auxiliary memory means for selecting one program address of said plurality of sets of program addresses stored in said auxiliary memory means;

address reading means operatively connected to said auxiliary memory means for reading out the program address in said auxiliary memory means selected by said program select register means;

memory address register means operatively connected to said main memory means and to said auxiliary memory means for addressing said main memory means with said program address read out by said address reading means;

instruction reading means operatively connected to said main memory means for reading out the input and output instruction in said main memory means addressed by said memory address register means;

instruction register means operatively connected to said main memory means for storing said input and output instruction read out by said instruction reading means;

a plurality of input and output control circuit means operatively connected to said instruction register means and to said plurality of devices, each of which has a plurality of input terminals to which said at least one input of each of said plurality of devices is connected and a plurality of output terminals to which said at least one output of each of said plurality of devices is connected, each of said plurality of input and output control circuit means including a decoder means operatively connected to said instruction register means and to said program select register means for selecting one of said plurality of output terminals of each in said plurality of devices specified by an output instruction in said instruction register means, said decoder means for each of said plurality of devices being selectively activated by said program selected register means, means operatively connected to said decoder means for energizing and deenergizing the output connected to the output terminal selected by said decoder means in accordance with said output instruction in said instruction register means, a second decoder means operatively connected to said instruction register means and to said program select register means for selecting one of said plurality of input terminals of each of said plurality of devices specified by an input instruction in said instruction register means, said second decoder means for each of said plurality of devices being selectively activated by said program select register means and comparing means operatively connected to said second decoder means for comparing the input connected to the input terminal selected by said another decoder means with the condition specified by said input instruction in said instruction means;

address modifying means operatively connected to said memory address register means for modifying said program address in said memory address register means;

destination address reading means operatively connected to said main memory means for reading out the destination address in saidmain memory means addressed by said memory address register means;

temporary register means operatively connected to said main memory means for storing said destination address read out by said destination address reading means;

writing means operatively connected to said auxiliary memory means for writing said destination address in said temporary register means into the same location of said auxiliary memory means from which said program address was read out by said address reading means;

means operatively connected to said program select register means for causing said program select register means to select a different program address after said destination address is written into said auxiliary memory means; and program control means responsive to the result of the comparison by said comparing means for modifying said program address in said memory address register means so as to skip to read out said destination address only when said result of said comparison is satisfactory.

6. A programmable logic controller for controlling a plurality of devices, each of said plurality of devices having at least one input and at least one output comprising:

main memory means for storing a plurality of programs, each of said plurality of programs consisting of a sequence of instructions including input and output instructions and destination addresses;

auxiliary memory means for storing a plurality of sets of program addresses corresponding to said plurality of devices, each of said sets of program addresses corresponding to said plurality of programs stored in said main memory means;

program select register means operatively connected to said auxiliary memory means for selecting one program address of said plurality of sets of program addresses stored in said auxiliary memory means;

address reading means operatively connected to said auxiliary memory means for reading out the program address in said auxiliary memory means selected by said program select register means;

memory address register means operatively connected tO said main memory means and to said auxiliary memory means for addressing said main memory means with said program address read out by said address reading means;

instruction reading means operatively connected tO said main memory means for reading out the input and output instruction in said main memory means addressed by said memory address register means;

instruction register means operatively connected to said main memory means for storing said input and output instruction read out by said instruction reading means;

a plurality of input and output control circuit means operatively connected to said instruction register means and to said plurality of devices, each of which has a plurality of input terminals to which said at least one input of each of said plurality of devices is connected and a plurality of output terminals to which said at least one output of each of said plurality of devices is connected, each of said plurality of input and output control circuit means including a decoder means operatively connected to said instruction register means and to said program select register means for selecting one of said plurality of output terminals of each of said plurality of devices specified by an output instruction in said instruction register means, said decoder means for each of said plurality of devices being selectively activated by said program selected register means, means operatively connected to said decoder means for energizing and deenergizing the output connected to the output terminal selected by said decoder means in accordance with said output instruction in said instruction register means, a second decoder means operatively connected to said instruction register means and to said program select register means for selecting one of said plurality of input terminals of each of said plurality of devices specified by an input instruction in said instruction register means, said second decoder means for each of said plurality of devices being selectively activated by said program select register means and comparing means operatively connected to said second decoder means for comparing the input connected to the input terminal selected by said another decoder means with the condition specified by said input instruction in said instruction means;

address modifying means operatively connected to said memory address register means for modifying said program address in said memory address register means;

destination address reading means operatively connected to said main memory means for reading out the destination address in said main memory means addressed by said memory address register means;

temporary register means operatively connected to said main memory means for storing said destination address read out by said destination address reading means;

writing means operatively connected to said auxiliary memory means for writing said destination address in said temporary register means into the same location of said auxiliary memory means from which said program address was read out by said address reading means;

means operatively connected to said program select register means for causing said program select register means to select a different program address after said destination address is written into said auxiliary memory means; and program control means responsive to the result of the comparison by said comparing means for modifying said program address in said memory address register means so as to skip to read out said destination address only when said result of said comparison is unsatisfactory.

7. A programmable logic controller for controlling a plurality of devices, each of said plurality of devices having at least one input and at least one output comprising:

main memory means for storing a plurality of programs, each of said plurality of programs consisting of a sequence of instructions including input and output instructions and destination addresses;

auxiliary memory means for storing a plurality of sets of program addresses corresponding to said plurality of devices, each of said sets of program addresses corresponding to said plurality of programs stored in said main memory means;

program select register means operatively connected to said auxiliary memory means for selecting one program address of said plurality of sets of program addresses stored in said auxiliary memory means;

address reading means operatively connected to said auxiliary memory means for reading out the program address in said auxiliary memory means selected by said program select register means;

memory address register means operatively connected to said main memory means and to said auxiliary memory means for addressing said main memory means with said program address read out by said address reading means;

instruction reading means operatively connected to said main memory means for reading out the input and output instruction in said main memory means addressed by said memory address register means;

instruction register means operatively connected to said main memory means for storing said input and output instruction read out by said instruction reading means;

input and output control circuit means operatively connected to said instruction register means and to said plurality of devices, which has a plurality of sets of input terminals and a plurality of sets of output terminals, said at least one input of each of said plurality of devices being connected to each of said sets of input terminals and said at least one output of each of said plurality of devices being connected to each of said sets of output terminals, said input and output control circuit means including a plurality of decoder means operatively connected to said instruction register means and to said program select register means, each of said plurality of decoder means provided for selecting one of said sets of input terminals and one of said sets of output terminals specified by an input and output instruction in said instruction register means, said plurality of decoder means corresponding to said plurality of devices and one of said plurality of decoder means being selectively activated by said program select register means, means operatively connected to said plurality of decoder means for energizing and deenergizing the output connected to the output terminal selected by said plurality of decoder means in accordance with an output instruction in said instruction register means and comparing means operatively connected to said plurality of decoder means for comparing the input connected to the input terminal selected by said plurality of decoder means with the condition specified by an input instruction in said instruction means;

address modifying means operatively connected to said memory address register means for modifying said program address in said memory address register means;

destination address reading means operatively connected to said main memory means for reading out the destination address in said main memory means addressed by said memorY address register means;

temporary register means operatively connected to said main memory means for storing said destination address read out by said destination address reading means;

writing means operatively connected to said auxiliary memory means for writing said destination address in said temporary register means into the same location of said auxiliary memory means from which said program address was read out by said address reading means;

means operatively connected to said program select register means for causing said program select register means to select a different program address after said destination address is written into said auxiliary memory means; and program control means responsive to the result of the comparison by said comparing means for modifying said program address in said memory address register means so as to skip to read out said destination address only when said result of said comparison is satisfactory.

8. A programmable logic controller for controlling a plurality of devices, each of said plurality of devices having at least one input and at least one output comprising:

main memory means for storing a plurality of programs, each of said plurality of programs consisting of a sequence of instructions including input and output instructions and destination addresses;

auxiliary memory means for storing a plurality of sets of program addresses corresponding to said plurality of devices, each of said sets of program addresses corresponding to said plurality of programs stored in said main memory means;

program select register means operatively connected to said auxiliary memory means for selecting one program address of said plurality of sets of program addresses stored in said auxiliary memory means;

address reading means operatively connected to said auxiliary memory means for reading out the program address in said auxiliary memory means selected by said program select register means;

memory address register means operatively connected to said main memory means and to said auxiliary memory means for addressing said main memory means with said program address read out by said address reading means;

instruction reading means operatively connected to said main memory means for reading out the input and output instruction in said main memory means addressed by said memory address register means;

instruction register means operatively connected to said main memory means for storing said input and output instruction read out by said instruction reading means;

input and output control circuit means operatively connected to said instruction register means and to said plurality of devices, which has a plurality of sets of input terminals and a plurality of sets of output terminals, said at least one input of each of said plurality of devices being connected to each of said sets of input terminals and said at least one output of each of said plurality of devices being connected to each of said sets of output terminals, said input and output control circuit means including a plurality of decoder means operatively connected to said instruction register means and to said program select register means, each of said plurality of decoder means provided for selecting one of said sets of input terminals and one of said sets of output terminals specified by an input and output instruction in said instruction register means, said plurality of decoder means corresponding to said plurality of devices and one of said plurality of decoder means being selectively activated by said program select register means, means operatively connected to said plurality of decoder means for energizing and deenergizing the output connected to the output terminal selected by said plurality of decoder means in accordance with an output instruction in said instruction register means and comparing means operatively connected to said plurality of decoder means for comparing the input connected to the input terminal selected by said plurality of decoder means with the condition specified by an input instruction in said instruction means;

address modifying means operatively connected to said memory address register means for modifying said program address in said memory address register means;

destination address reading means operatively connected to said main memory means for reading out the destination address in said main memory means addressed by said memory address register means;

temporary register means operatively connected to said main memory means for storing said destination address read out by said destination address reading means;

writing means operatively connected to said auxiliary memory means for writing said destination address in said temporary register means into the same location of said auxiliary memory means from which said program address was read out by said address reading means;

means operatively connected to said program select register means for causing said program select register means to select a different program address after said destination address is written into said auxiliary memory means; and program control means responsive to the result of the comparison by said comparing means for modifying said program address in said memory address register means so as to skip to read out said destination address only when said result of said comparison is unsatisfactory.

* * * * *